(12) United States Patent
Li et al.

(10) Patent No.: US 11,070,263 B2
(45) Date of Patent: Jul. 20, 2021

(54) BEAMFORMING TRAINING METHOD, RECEIVING DEVICE, AND SENDING DEVICE

(71) Applicant: HUAWEI TECHNOLOGIES CO., LTD., Guangdong (CN)

(72) Inventors: Dejian Li, Shenzhen (CN); Jinnan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/430,730

(22) Filed: Jun. 4, 2019

(65) Prior Publication Data
US 2019/0288760 A1    Sep. 19, 2019

Related U.S. Application Data

(63) Continuation of application No. PCT/CN2017/092110, filed on Jul. 6, 2017.

(51) Int. Cl.
*H04B 7/06* (2006.01)
*H04B 17/11* (2015.01)
(Continued)

(52) U.S. Cl.
CPC .......... *H04B 7/0617* (2013.01); *H04B 7/04* (2013.01); *H04B 7/0695* (2013.01); *H04B 7/088* (2013.01); *H04B 17/11* (2015.01); *H04L 27/2646* (2013.01)

(58) Field of Classification Search
CPC .......... H04B 7/088; H04B 17/11; H04B 7/04; H04B 7/0632; H04B 7/0617; H04B 7/0695; H04B 7/0634; H04L 27/2646
See application file for complete search history.

(56) References Cited

U.S. PATENT DOCUMENTS

| 2009/0318091 A1* | 12/2009 | Wang | H04B 7/0695 455/67.14 |
|---|---|---|---|
| 2010/0214169 A1* | 8/2010 | Kafle | H04B 7/0695 342/368 |

(Continued)

FOREIGN PATENT DOCUMENTS

| CN | 101682377 A | 3/2010 |
|---|---|---|
| CN | 104303477 A | 1/2015 |

(Continued)

OTHER PUBLICATIONS

Extended European Search Report issued in European Application No. 17917154.1 dated Jan. 7, 2020, 17 pages.

(Continued)

*Primary Examiner* — Syed Haider
(74) *Attorney, Agent, or Firm* — Fish & Richardson P.C.

(57) ABSTRACT

This application provides example beamforming (BF) training methods, receiving devices, and sending devices. One example method includes performing BF training on at least one channel with a first device based on BF training request information, where the BF training request information includes antenna configuration information of the BF training and channel configuration information of the at least one channel. First feedback information sent by the first device is received, where the first feedback information includes a measurement result of the BF training, information about an antenna corresponding to the measurement result, beam information of the antenna, and channel information corresponding to the antenna. At least one of an optimal antenna configuration or digital domain BF precoding information on the at least one channel is determined based on the first feedback information.

8 Claims, 20 Drawing Sheets

(51) Int. Cl.
*H04B 7/08* (2006.01)
*H04L 27/26* (2006.01)
*H04B 7/04* (2017.01)

(56) References Cited

U.S. PATENT DOCUMENTS

| | | | |
|---|---|---|---|
| 2012/0106474 A1 | 5/2012 | Wu et al. | |
| 2015/0244432 A1* | 8/2015 | Wang | H04B 7/0695 375/267 |
| 2015/0288439 A1 | 10/2015 | Kim et al. | |
| 2016/0080051 A1* | 3/2016 | Sajadieh | H04B 7/0452 375/267 |
| 2016/0269093 A1 | 9/2016 | Seol et al. | |
| 2017/0111099 A1* | 4/2017 | Jo | H04B 7/063 |
| 2017/0126303 A1 | 5/2017 | Jo et al. | |

FOREIGN PATENT DOCUMENTS

| | | |
|---|---|---|
| CN | 104734754 A | 6/2015 |
| CN | 104935372 A | 9/2015 |
| CN | 106559114 A | 4/2017 |
| WO | 2016167908 A1 | 10/2016 |
| WO | 2017088898 A1 | 6/2017 |

OTHER PUBLICATIONS

IEEE P802.11ay/D0.35, May 2017, Draft Standard for Information Technology—Telecommunications and Information Exchange Between Systems—Local and Metropolitan Area Networks—Specific Requirements—Part 11: Wireless LAN Medium Access Control (MAC) and Physical Layer(PHY) Specifications—Amendment 7: Enhanced throughput for operation in license-exempt bands above 45 GHz, 256 pages.

International Search Report and Written Opinion issued in International Application No. PCT/CN2017/092110 dated Mar. 29, 2018, 11 pages.

Cordeiro, "Specification Framework for TGay," IEEE P802.11-15/01358r8, vol. 802.11ay, No. 8, Nov. 23, 2016, XP068110625, 90 pages.

Communication pursuant to Rule 164(1) EPC, Partial Supplementary European Search Report issued in European Application No. 17917154.1 dated Nov. 25, 2019, 16 pages.

Office Action issued in Chinese Application No. 201780092630.8 dated Nov. 2, 2020, 24 pages (with English translated).

* cited by examiner

| Legacy short training field | Legacy channel estimation field | Legacy header | Enhanced directional multi-gigabit header A | Enhanced directional multi-gigabit training field | Enhanced directional multi-gigabit channel estimation field | Enhanced directional multi-gigabit header B | Data | Automatic gain control | Training field |

BEAMFORMING TRAINING METHOD, RECEIVING DEVICE, AND SENDING DEVICE

CROSS-REFERENCE TO RELATED APPLICATION

This application is a continuation of International Application No. PCT/CN2017/092110, filed on Jul. 6, 2017, the disclosure of which is hereby incorporated by reference in its entirety.

TECHNICAL FIELD

This application relates to the communications field, and more specifically, to a beamforming training method during communication, a receiving device, and a sending device.

BACKGROUND

To ease the growing strain on spectrum resources, huge bandwidth resources in a millimeter-wave band can meet people's communication requirements. A communications technology of the millimeter-wave band can provide communication at a high rate of several gigabits per second, to satisfy uncompressed transmission of a high definition video. However, with development of technologies such as an ultra high definition video technology, virtual reality, and augmented reality, a communication rate of several gigabits per second gradually fails to meet a communication requirement. To further increase a data rate, in high-frequency communication, higher channel bandwidth and more antennas begin to be used, in the expectation that a communication rate reaches a rate of dozens of gigabits. For example, in the wireless local area network (WLAN) 802.11ay standard formulated by the Institute of Electrical and Electronics Engineers (IEEE), a manner of increasing channel bandwidth and increasing spatial streams/space-time streams through channel bonding and a multiple-input multiple-output (MIMO) technology is proposed, to increase the communication rate to more than 20 gigabits per second.

Due to a relatively short communication distance, a main application scenario of millimeter-wave communication is indoor line-of-sight (LOS) application. This is adverse to implementation of an MIMO technology requiring abundant scattering paths. At present, LOS MIMO is mainly implemented through dual polarization or orthogonal polarization, frequency division multiplexing in which a plurality of antennas are respectively configured on a plurality of channels, an increase in an antenna spacing, or the like.

When the MIMO technology is used in the millimeter-wave band, to reduce a path loss, simulation beamforming (BF) training still needs to be performed. When a plurality of antennas or a plurality of radio frequency chains in MIMO are combined with a plurality of channels, for example, combined with a plurality of channels in channel aggregation or combined with polarization channels in orthogonal polarization, in a feedback of channel state information (channel state information, "CSI" for short), a feedback of one or more optimal MIMO links, and a feedback of a modulation and coding scheme (MCS) of MIMO BF training, impact of a channel needs to be considered.

A current feedback of CSI/an MCS is a feedback of an orthogonal frequency division multiplexing (orthogonal frequency division multiplexing, OFDM) symbol for a frequency domain. The feedback of the CSI is generally correlated only to a subcarrier or a subband. To be specific, a signal-to-noise ratio (SNR)/an MCS/CSI of a receive chain/a space-time stream corresponding to the subcarrier or the subband is fed back, but for frequency division multiplexing or channel aggregation of a plurality of antennas, accuracy of a channel capacity learned of from such a feedback result is not high, and an antenna configuration corresponding to a channel and MCS configurations on different channels cannot be learned of Consequently, an optimal antenna configuration and digital domain BF precoding information cannot be determined.

SUMMARY

This application provides a beamforming training method, a receiving device, and a sending device, to map a transmit antenna (a transmit chain), a transmit sector (a transmit beam), and a channel in a beamforming BF training feedback to an SNR/an MCS/CSI of a receive chain, thereby learning of a maximum channel capacity from the feedback, and obtaining an optimal MIMO antenna configuration and channel configuration. The BF training feedback may further include an indication whether a CSD needs to be used for a plurality of spatial streams/space-time streams (referred to as streams for short), and if a measurement result of BF training shows that the CSD does not need to be applied, an indication that the CSD is not applied is provided to a peer device, to help increase a packet detection rate of a legacy STA and a decoding success rate of an L-Header field in a PPDU.

According to a first aspect, a beamforming training method is provided. The method includes: performing BF training on at least one channel with a first device based on BF training request information, where the BF training request information includes antenna configuration information of the BF training and channel configuration information of the at least one channel; receiving first feedback information sent by the first device, where the first feedback information includes a measurement result of the BF training, information about an antenna corresponding to the measurement result of the BF training, beam information of the antenna, and channel information corresponding to the antenna; and determining an optimal antenna configuration and/or digital domain BF precoding information on the at least one channel based on the first feedback information.

Based on the beamforming training method provided in the first aspect, a transmit antenna, a transmit sector (a transmit beam), and a channel of the transmit antenna in the first feedback information (final feedback information) of the beamforming training can be mapped to the measurement result obtained through measurement by the first device, thereby learning of a maximum channel capacity from the feedback, and obtaining an optimal MIMO channel configuration.

In a possible implementation of the first aspect, the antenna configuration information includes numbers of one or more antennas configured on each channel in the BF training; and the channel configuration information includes at least one of the following information: information about a channel bonding manner or a channel aggregation manner used by a BF training sequence, indication information indicating whether the BF training is to be performed on all channels for each antenna, order information of a channel for performing the BF training for each antenna, or number information of a channel for performing the BF training for each antenna.

In a possible implementation of the first aspect, when the BF training is performed in a channel aggregation mode, the BF training request information further includes indication information used to indicate whether the BF training is to be performed on all channels. The BF training request information includes the indication information used to indicate whether the BF training is to be performed on all the channels, so that the BF training can be supported on all the channels, to help obtain a BF measurement result on each channel, thereby obtaining a more accurate antenna configuration and channel configuration.

In a possible implementation of the first aspect, when a plurality of rounds of BF training are performed, before the receiving the first feedback information, the method further includes: receiving second feedback information, where the second feedback information includes a measurement result that is obtained when the BF training needs to be performed on a plurality of channels for each antenna and that is corresponding to a channel on which the BF training has been completed.

In a possible implementation of the first aspect, when the BF training needs to be performed on a plurality of beams of one antenna, the BF training request information further includes sequence number information of a plurality of Beam Refinement Protocol BRP packets used to perform the BF training on the plurality of beams of the antenna and length information of a training sequence in each BRP packet; and the measurement result of the BF training includes the sequence number information of the BRP packet corresponding to each beam indicated by the beam information and the length information of the training sequence in the BRP packet.

In a possible implementation of the first aspect, the first feedback information further includes modulation and coding scheme information of each of the at least one channel corresponding to the measurement result of the BF training.

In a possible implementation of the first aspect, the first feedback information further includes indication information used to indicate whether a cyclic shift diversity CSD needs to be used for a plurality of space-time streams corresponding to a plurality of antennas.

According to a second aspect, a beamforming training method is provided. The method includes: performing BF training on at least one channel with a second device based on BF training request information, where the BF training request information includes antenna configuration information of the BF training and channel configuration information of the at least one channel; determining first feedback information, where the first feedback information includes a measurement result of the BF training, information about an antenna corresponding to the measurement result of the BF training, beam information of the antenna, and channel information corresponding to the antenna; and sending the first feedback information to the second device.

Based on the beamforming training method provided in the second aspect, a transmit antenna, a transmit sector (a transmit beam), and a channel of the transmit antenna in the first feedback information (final feedback information) of the beamforming training correspond to an SNR/an MCS/CSI measured by the first device, thereby learning of a maximum channel capacity from the feedback, and obtaining an optimal channel configuration.

In a possible implementation of the second aspect, the antenna configuration information includes a number of an antenna configured on each channel in the BF training; and the channel configuration information includes at least one of the following information: information about a channel bonding manner or a channel aggregation manner used by a BF training sequence, indication information indicating whether the BF training is to be performed on all channels for each antenna, order information of a channel for performing the BF training for each antenna, or number information of a channel for performing the BF training for each antenna.

In a possible implementation of the second aspect, when the BF training is performed in a channel aggregation mode, the BF training request information further includes indication information used to indicate whether the BF training is to be performed on all channels.

In a possible implementation of the second aspect, when a plurality of rounds of BF training are performed, before the sending the first feedback information to the second device, the method further includes: determining second feedback information, where the second feedback information includes a measurement result that is obtained when the BF training needs to be performed on a plurality of channels for each antenna and that is corresponding to a channel on which the BF training has been completed; and sending the second feedback information to the second device.

In a possible implementation of the second aspect, the measurement result of the BF training includes sequence number information of a Beam Refinement Protocol BRP packet corresponding to each beam indicated by the beam information, and length information of a training sequence in the BRP packet.

In a possible implementation of the second aspect, the first feedback information further includes modulation and coding scheme information of each of the at least one channel corresponding to the measurement result of the BF training.

In a possible implementation of the second aspect, the first feedback information further includes indication information used to indicate whether a cyclic shift diversity CSD needs to be used for a plurality of space-time streams corresponding to a plurality of antennas.

According to a third aspect, a beamforming training method is provided. The method includes: performing beamforming BF training on at least one channel with a first device based on BF training request information, where the BF training request information includes antenna configuration information and channel configuration information of the BF training; receiving first feedback information of the beamforming BF training sent by the first device, where the first feedback information includes indication information used to indicate whether a cyclic shift diversity CSD needs to be used for a plurality of space-time streams corresponding to a plurality of antennas; and determining, based on the first feedback information, whether the CSD is to be used for each of the plurality of space-time streams.

Based on the beamforming training method provided in the third aspect, received final feedback information includes indication information indicating whether CSD coding needs to be used for each of a plurality of links. It can be determined, based on the indication information, whether the CSD coding is to be used for different streams, to help increase a packet detection rate of a legacy STA and a decoding success rate of an L-Header field in a PPDU.

In a possible implementation of the third aspect, the antenna configuration information includes a number of an antenna configured on each channel in the BF training; and the channel configuration information includes at least one of the following information: information about a channel bonding manner or a channel aggregation manner used by a BF training sequence, indication information indicating whether the BF training is to be performed on all channels for each antenna, or order information of a channel for performing the BF training for each antenna.

In a possible implementation of the third aspect, the first feedback information further includes a measurement result of the BF training, information about an antenna corresponding to the measurement result of the BF training, beam information of the antenna, and channel information corresponding to the antenna.

According to a fourth aspect, a beamforming training method is provided. The method includes: performing beamforming BF training on at least one channel with a second device based on BF training request information, where the BF training request information includes antenna configuration information and channel configuration information of the BF training; determining, based on a measurement result of the BF training, whether a cyclic shift diversity CSD needs to be used for a plurality of space-time streams corresponding to a plurality of antennas; and sending first feedback information to the second device, where the first feedback information includes indication information used to indicate whether the CSD needs to be used for each of the plurality of space-time streams.

Based on the beamforming training method provided in the fourth aspect, whether the plurality of streams corresponding to the plurality of antennas are correlated is determined based on the measurement result of the BF training; and if the plurality of streams are correlated, it is determined that the CSD needs to be used for the plurality of streams; or if the plurality of streams are not correlated, it is determined that the CSD does not need to be used for the plurality of streams. The first feedback information includes the indication information indicating whether the CSD coding needs to be used for each of the plurality of space-time streams. It is determined, based on the indication information, whether the CSD coding is to be used for different streams, to help increase a packet detection rate of a legacy STA and a decoding success rate of an L-Header field in a PPDU.

In a possible implementation of the fourth aspect, the antenna configuration information includes a number of an antenna configured on each channel in the BF training; and the channel configuration information includes at least one of the following information: information about a channel bonding manner or a channel aggregation manner used by a BF training sequence, indication information indicating whether the BF training is to be performed on all channels for each antenna, or order information of a channel for performing the BF training for each antenna.

In a possible implementation of the fourth aspect, the determining, based on a measurement result of the BF training, whether a cyclic shift diversity CSD needs to be used for a plurality of space-time streams corresponding to a plurality of antennas includes: when it is determined, based on the measurement result, that the plurality of space-time streams respectively belong to different channels, determining that the CSD is not used for the plurality of space-time streams; or determining, when it is determined, based on the measurement result, that at least two of the plurality of space-time streams belong to a same channel, depending on whether the at least two space-time streams are correlated, whether the CSD needs to be used for the at least two space-time streams.

In a possible implementation of the fourth aspect, the determining, when at least two of the plurality of space-time streams belong to a same channel, depending on whether the at least two space-time streams are correlated, whether the CSD needs to be used for the at least two space-time streams includes: when the at least two space-time streams use a same polarization manner, determining that the at least two space-time streams are correlated; and determining, in the at least two space-time streams, a space-time stream for which the CSD needs to be used.

In a possible implementation of the fourth aspect, the determining, when at least two of the plurality of space-time streams belong to a same channel, depending on whether the at least two space-time streams are correlated, whether the CSD needs to be used for the at least two space-time streams includes: when the at least two space-time streams use different orthogonal polarization manners, and a value of a correlation between the at least two space-time streams is less than a preset value, determining that the at least two space-time streams are not correlated; and determining that the CSD does not need to be used for the at least two space-time streams.

In a possible implementation of the fourth aspect, the first feedback information further includes a measurement result of the BF training, information about an antenna corresponding to the measurement result of the BF training, beam information of the antenna, and channel information corresponding to the antenna.

According to a fifth aspect, a receiving device is provided. The receiving device includes a processor, a memory, and a transceiver that are configured to support the receiving device in performing a corresponding function in the foregoing method. The receiving device is the second device in the foregoing method. The processor, the memory, and the transceiver are connected through communication. The memory stores an instruction. The transceiver is configured to perform specific signal receiving and sending when driven by the processor. The processor is configured to invoke the instruction to implement the beamforming training method according to the first aspect or the third aspect and various implementations thereof.

According to a sixth aspect, a receiving device is provided. The receiving device includes a processing module, a storage module, and a transceiver module that are configured to support the receiving device in performing a function of a receiving device according to any one of the first aspect or the possible implementations of the first aspect, or a function of a receiving device according to any one of the third aspect or the possible implementations of the third aspect. The receiving device is the second device in the foregoing method. The function may be implemented by hardware or may be implemented by executing corresponding software by hardware. The hardware or the software includes one or more modules corresponding to the foregoing function.

According to a seventh aspect, a sending device is provided. The sending device includes a processor, a memory, and a transceiver that are configured to support the sending device in performing a corresponding function in the foregoing method. The sending device is the first device in the foregoing method. The processor, the memory, and the transceiver are connected through communication. The memory stores an instruction. The transceiver is configured to perform specific signal receiving and sending when driven by the processor. The processor is configured to invoke the instruction to implement the beamforming training method according to the second aspect or the fourth aspect and various implementations thereof.

According to an eighth aspect, a sending device is provided. The sending device includes a processing module, a storage module, and a transceiver module that are configured to support the sending device in performing a function of a sending device according to any one of the second aspect or the possible implementations of the second aspect, or a function of a sending device according to any one of the fourth aspect or the possible implementations of the fourth aspect. The sending device is the first device in the foregoing method. The function may be implemented by hardware or may be implemented by executing corresponding software by hardware. The hardware or the software includes one or more modules corresponding to the foregoing function.

According to a ninth aspect, a computer-readable storage medium is provided. The computer-readable storage medium is configured to store a computer program. The computer program includes an instruction used to perform the method according to any one of the first aspect or the possible implementations of the first aspect, and the method according to any one of the third aspect or the possible implementations of the third aspect.

According to a tenth aspect, a computer-readable storage medium is provided. The computer-readable storage medium is configured to store a computer program. The computer program includes an instruction used to perform the method according to any one of the second aspect or the possible implementations of the second aspect, and the method according to any one of the fourth aspect or the possible implementations of the fourth aspect.

BRIEF DESCRIPTION OF THE DRAWINGS

FIG. 2 is a schematic diagram of a frame format of a PPDU;

DETAILED DESCRIPTION

Figure 1:
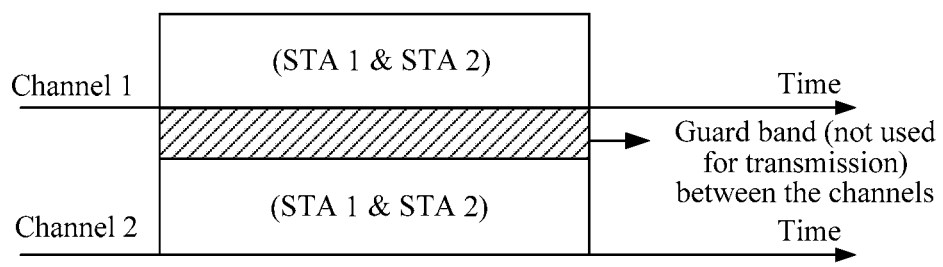
FIG. 1 is a schematic diagram of transmission in a channel aggregation mode.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that, the technical solutions in this application may be applied to various communications systems, for example, a Long Term evolution (LTE) system, an LTE/LTE-A frequency division duplex (FDD) system, an LTE/LTE-A time division duplex (TDD) system, a Universal Mobile Telecommunications System (UMTS), a Worldwide Interoperability for Microwave Access (WiMAX) communications system, a public land mobile network (PLMN) system, a device to device (D2D) network system or a machine to machine (M2M) network system, a Wireless Fidelity (Wi-Fi) system, a wireless local area network (WLAN), and a future 5G communications system.

It should be further understood that, in the embodiments of the present invention, a terminal device may also be referred to as user equipment (UE), a mobile station (MS), a mobile terminal, and the like. The terminal device may communicate with one or more core network devices by using a radio access network (radio access network, RAN). For example, the terminal device may include various handheld devices having a wireless communication function, an in-vehicle device, a wearable device, a computing device, or another processing device connected to a wireless modem. The terminal device may further include a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or a station (STA) in a wireless local area network (WLAN). The terminal device may be a cellular phone, a cordless phone, a Session Initiation Protocol (SIP) phone, a wireless local loop (WLL) station, and a next-generation communications system such as a terminal device in a 5G network, or a terminal device in a future evolved public land mobile network (PLMN). This is not limited in the embodiments of the present invention.

It should be further understood that, a base station may also be referred to as a network side device or an access network device. The network side device may be a device configured to communicate with the terminal device. The network device may be an evolved NodeB (eNB or eNodeB) in an LTE system, a gNB or an access point in NR, a base station transceiver, a transceiver node, an in-vehicle device, a wearable device, a network device in a future 5G network, or a network side device in a future evolved PLMN system. For example, the network side device may be an access point (AP) in a WLAN, or may be a base transceiver station (BTS) in Global System for Mobile Communications (GSM) or Code Division Multiple Access (CDMA) CDMA. The network side device may alternatively be an evolved NodeB (eNB or eNodeB) in an LTE system. Alternatively, the network device may be a NodeB (Node B) in a 3rd generation (3G) system. In addition, the network device may be a relay node, an access point, an in-vehicle device, a wearable device, a network device in a future 5G network, a network device in a future evolved PLMN network, or the like. This is not limited in the embodiments of the present invention. For ease of description, in all the embodiments of the present invention, the foregoing apparatuses providing a wireless communication function to an MS are collectively referred to as network devices.

A MIMO technology is used in a millimeter-wave band. To reduce a path loss, analog BF training still needs to be performed first, to close a MIMO link between receiving and sending devices. When a plurality of antennas/a plurality of radio frequency chains in MIMO links are combined with a plurality of channels, for example, a plurality of antennas of the receiving and sending devices are combined with a plurality of channels in channel aggregation, or a plurality of radio frequency chains of receiving and sending devices having orthogonal polarization antennas are combined with polarization channels in orthogonal polarization, in a result feedback of the BF training, for example, a feedback of CSI of the BF training, a feedback of beam information corresponding to one or more optimal MIMO links, and a feedback of an MCS, impact of a channel needs to be considered. Particularly, when the beam information corresponding to the one or more optimal MIMO links is fed back, channel information corresponding to each MIMO link needs to be fed back. In addition, when MIMO is implemented through orthogonal polarization, a new design requirement is also raised for MIMO precoding.

In the prior art, a Frequency Division Multiple Access technology for a plurality of spatial streams or space-time streams is provided, and different radio frequency (RF) chains/antennas work on different channels. To be specific, concurrent transmission of a plurality of spatial streams/space-time streams between one pair of devices is implemented through frequency division multiplexing. A space-time stream is a stream of modulation symbols generated after space-time processing is performed on modulation symbols of one or more spatial streams (spatial stream). Generally, one transmit antenna corresponds to one space-time stream. For brevity, in the embodiments of the present invention, a spatial stream or a space-time stream is referred to as a "stream" for short.

Concurrent transmission of a plurality of streams between one pair of receiving and sending devices through frequency division multiplexing is mainly implemented through channel aggregation (CA). For example, two same high-frequency modem modules are used in one device. The modem modules independently work on different channels, and one stream is sent by using one independent antenna, to implement channel aggregation transmission. As shown in FIG. 1, a STA 1 and a STA 2 send data on a channel 1 and a channel 2 simultaneously. FIG. 1 is a schematic diagram of transmission in a channel aggregation mode. In addition, MCSs used on different channels may be the same or different, and there is a guard band between channels.

In the prior art, a feedback of CSI is generally correlated only to a subcarrier or a subband, and a feedback of an MCS is mainly correlated to a stream. For example, the feedback of the CSI in the prior art includes an explicit CSI feedback and an implicit CSI feedback. The explicit CSI feedback is a feedback of an SNR of each receive chain and a CSI matrix of each subcarrier. A receive chain is a radio frequency chain used to receive a signal on a receive side, and the radio frequency chain can complete processing on the received signal, to form a digital signal and provide the digital signal to a baseband. A CSI matrix is a channel matrix between a plurality of receive and transmit antennas. The implicit CSI feedback refers to an SNR of each stream and a digital domain BF feedback matrix of each subcarrier. The implicit CSI mainly means that key information included in a CSI matrix, for example, a digital domain (baseband) BF feedback matrix obtained through calculation of the CSI matrix, is fed back, instead of feeding back the CSI matrix.

The feedback of the MCS in the prior art is included in a high throughput control field, and the feedback of the MCS includes an MCS number and may indicate unequal (Unequal) MCSs, to be specific, indicate different MCSs used by different streams.

The feedback of the CSI/the MCS in the prior art is an OFDM feedback for a frequency domain. The feedback of the CSI is generally correlated only to a subcarrier or a subband. To be specific, an SNR/an MCS/CSI of a receive chain/a stream corresponding to the subcarrier or the subband is fed back. In a feedback result, a transmit antenna, a transmit sector (a transmit beam), and a channel are not mapped to the SNR/the MCS/the CSI of the receive chain/the space-time stream. In current MIMO based on CA or orthogonal polarization, after BF training is completed on a plurality of channels, when information about an optimal link with highest link quality is fed back, a transmit antenna and a transmit sector in the information about the optimal link need to be mapped to a channel, an SNR, an MCS, and CSI of a space-time stream that are fed back, to be specific, complete and accurate information about the optimal link is fed back, to achieve a maximum channel capacity. Completion of the BF training on one channel means that both an initiator and a responder of the BF training have already completed transmit BF training and/or receive BF training on the channel based on training content indicated by BF training request information.

FIG. 2 is a schematic diagram of a frame format of an enhanced directional multi-gigabit (EDMG) physical layer protocol data unit (PPDU). An automatic gain control (AGC) field and a training (TRN) field in FIG. 2 are used for analog BF training in a Beam Refinement Protocol (BRP) phase.

When a signal correlation between different spatial streams or space-time streams is removed, a larger cyclic shift diversity (CSD) is preferred, but an excessively large CSD causes a legacy station (L-STA) to receive very strong inter symbol interference (ISI). This is adverse to successful reception by the L-STA. In addition, when there is no correlation between spatial streams/space-time streams, the CSD does not need to be used, and no use of the CSD helps increase a success rate of packet detection by the legacy station (L-STA) and a decoding success rate of a legacy header (L-Header) field in the physical layer protocol data unit (PPDU).

Figure 3:
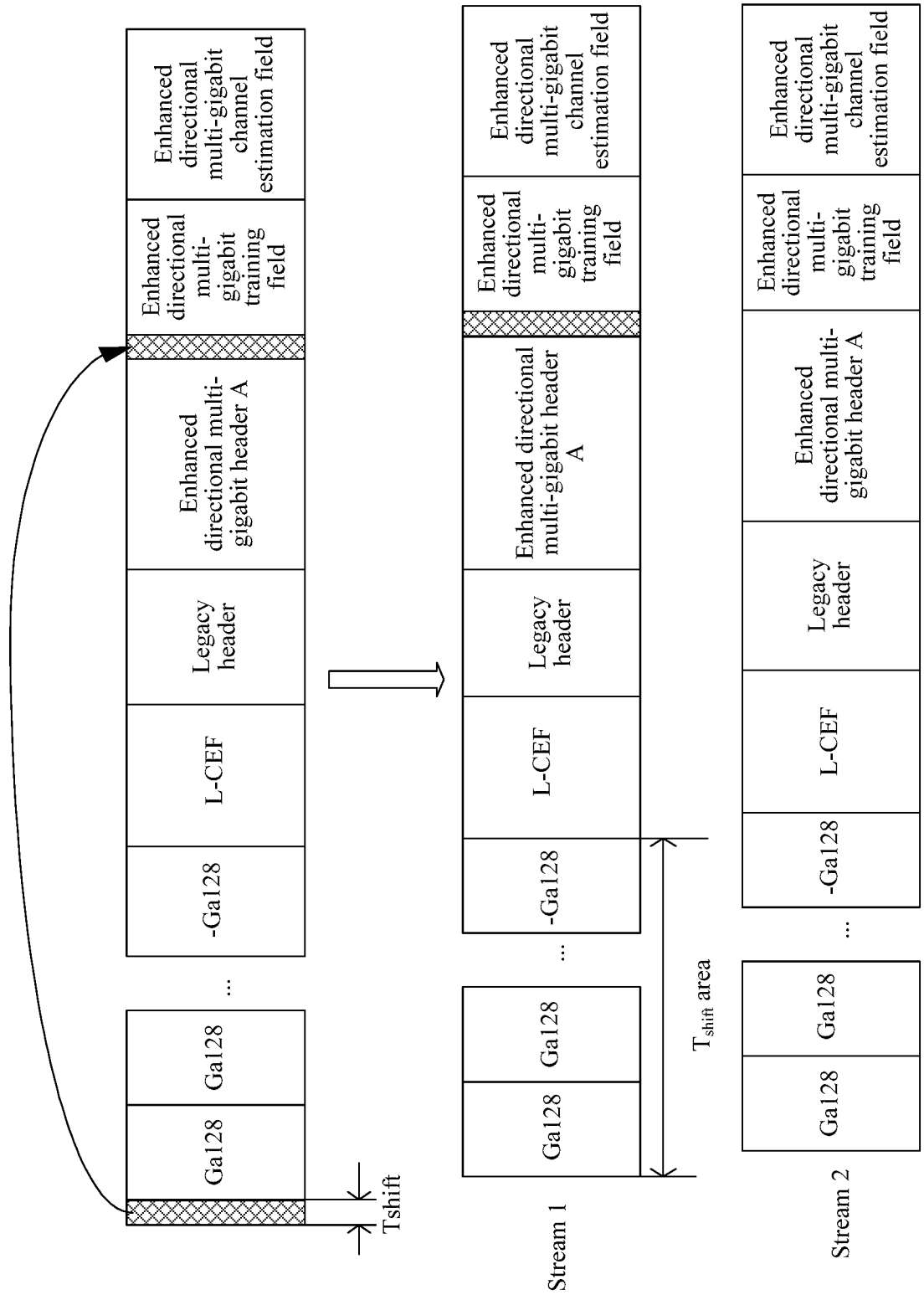
FIG. 3 is a schematic diagram of applying a CSD to two different streams of an enhanced directional multi-gigabit PPDU.

FIG. 3 is a schematic diagram of applying a CSD to two different streams of an EDMG PPDU. As shown in FIG. 3, an EDMG PPDU frame includes a Golay sequence field, a legacy short training field (1L-STF), a legacy channel estimation field (L-CEF), a legacy header (L-Header), and an EDMG header A (EDMG-Header-A) field. A Ga128 field in FIG. 3 is a subsequence having a length of 128 of the Golay sequence. Application of CSD coding means that the CSD is used for either of the two streams, and a partial sequence having a time length of $T_{shift}$ at the beginning of a first Ga128 sequence in the L-STF is attached to a rear end of the EDMG-Header-A field, to be specific, the partial sequence corresponding to $T_{shift}$ is cyclically shifted to the rear end of the EDMG-Header-A field, so that front parts of the stream 1 and the stream 2 in an EDMG-STF field are aligned in time, but the stream 1 and the stream 2 have different sequence content, thereby eliminating a signal correlation between the stream 1 and the stream 2 and an unexpected beamforming effect.

When a signal correlation between different streams is removed, a larger CSD is preferred, but an excessively large CSD causes very strong ISI. Even if a multipath effect also occurs in an LOS application, an error detection rate of a preamble by an L-STA is increased, including degrading performance of packet detection, decoding of physical layer signaling fields (such as L-Header and EDMG-Header-A fields), and the like. Consequently, the L-STA cannot correctly decode duration of the PPDU based on the physical layer signaling fields. However, when there is no correlation between a plurality of streams, the CSD does not need to be used, and no use of the CSD helps increase a packet detection rate of the L-STA and a decoding success rate of the L-Header field.

Based on the foregoing problem, an embodiment of the present invention provides a beamforming training method, to map a transmit antenna, a transmit sector (a transmit beam), and a channel in a beamforming training feedback to an SNR/an MCS/CSI of a receive chain, thereby learning of a maximum channel capacity from the feedback, and obtaining an optimal MIMO channel configuration. Whether a CSD needs to be used for different streams may be further indicated, to help increase a packet detection rate of a legacy STA and a decoding success rate of an L-Header field in a PPDU.

Figure 4:
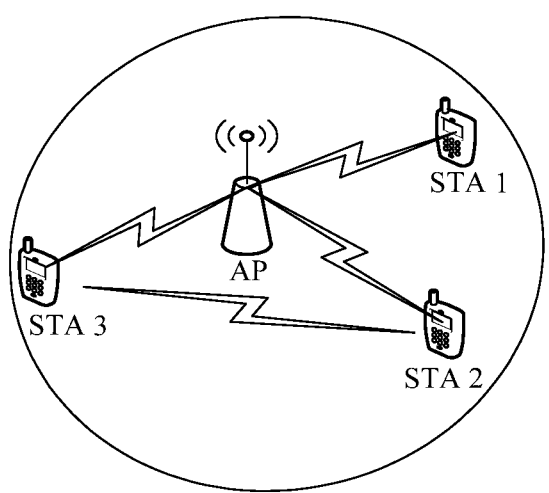
FIG. 4 is a schematic diagram of an application scenario according to an embodiment of the present invention.

FIG. 4 is a schematic diagram of an application scenario according to an embodiment of the present invention. As shown in FIG. 4, the present invention is mainly applied to a wireless local area network, and a system architecture or a scenario of the present invention includes a process in which at least one AP performs wireless communication with at least one STA, and may also be extended to a scenario in which a network device performs wireless communication with a terminal device. This is not limited in this embodiment of the present invention.

It should be understood that, this embodiment of the present invention is described by using only the application scenario shown in FIG. 4 as an example, but this embodiment of the present invention is not limited thereto. For example, the system may include more APs and STAs, or the AP may communicate with each STA.

Figure 5:
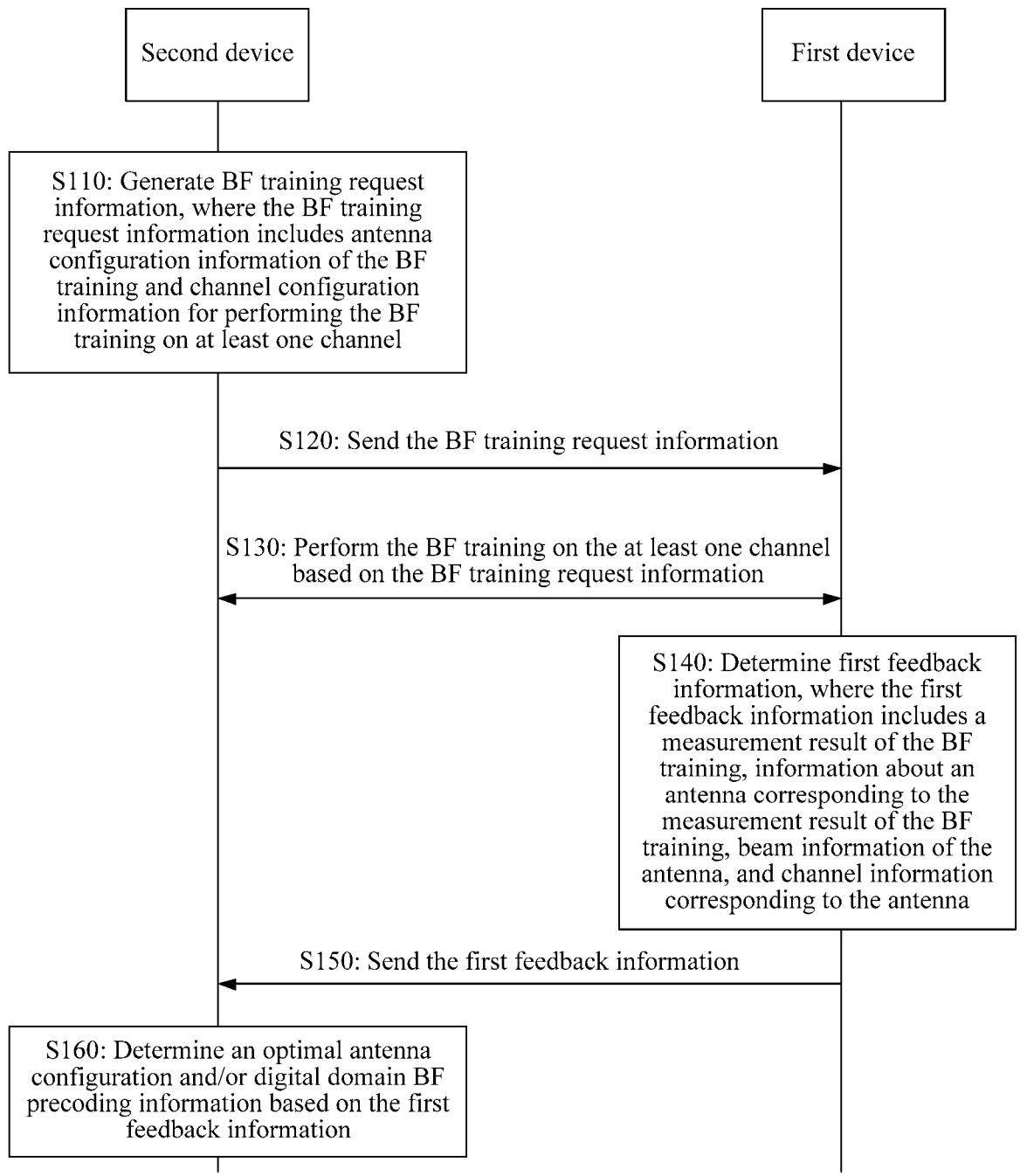
FIG. 5 is a schematic flowchart of a beamforming training method according to an embodiment of the present invention.

The beamforming training method provided in this application is described in detail below with reference to FIG. 5. FIG. 5 is a schematic flowchart of a beamforming training method 100 according to an embodiment of the present invention. The method 100 may be applied to a scenario shown in FIG. 5, and certainly, may also be applied to another communication scenario. This is not limited in this embodiment of the present invention.

As shown in FIG. 5, the method 100 includes the following steps:

S110: A second device generates beamforming BF training request information, where the BF training request information includes antenna configuration information of BF training and channel configuration information for performing the BF training on at least one channel.

S120: The second device sends the BF training request information to a first device.

S130: The second device performs the BF training on the at least one channel with the first device based on the BF training request information.

S140: The first device determines first feedback information, where the first feedback information includes a measurement result of the BF training, information about an antenna corresponding to the measurement result of the BF training, beam information of the antenna, and channel information corresponding to the antenna.

S150: The first device sends the first feedback information to the second device.

S160: The second device determines an optimal antenna configuration and/or digital domain BF precoding information on the at least one channel based on the first feedback information.

Figure 6:
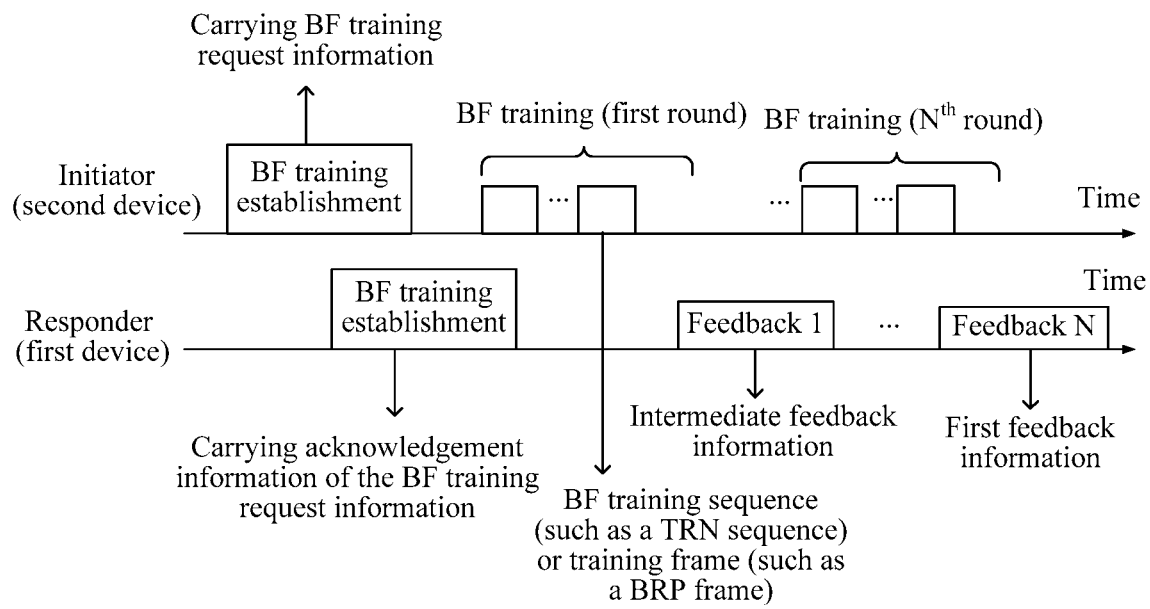
FIG. 6 is a schematic diagram of performing BF training by a second device and a first device according to an embodiment of the present invention.

Specifically, FIG. 6 is a schematic diagram of performing the BF training by the second device and the first device according to an embodiment of the present invention. A process of interaction between an initiator (the second device) and a responder (the first device) of the BF training in time is shown in FIG. 6. In FIG. 6, each round of BF training includes BF training request information sent by the initiator and feedback information sent by the responder. To negotiate a MIMO mode for working, before performing the BF training, the initiator and the responder need to configure a training mode and a parameter for a BF training process through a BF establishment process. After completing BF establishment, the initiator and the responder perform one or more rounds of BF training. A plurality of rounds of BF training help the initiator accelerate alignment of beams between a plurality of receive and transmit antennas based on intermediate feedback information during the process, and accelerate obtaining of an optimal MIMO simulation antenna configuration. N is a positive integer. For example, when N=1, it indicates that the initiator and the responder perform only one round of BF training. After the BF training ends, the first device sends first feedback information (final feedback information) to the second device, to notify the initiation device of a result of the current training.

It should be understood that, in this embodiment of the present invention, an antenna of the second device and/or the first device may be any one of a phased array antenna, a directional antenna, a single antenna having orthogonal polarization (dual polarization), and a dual-antenna having different polarization capabilities. In this embodiment of the present invention, an antenna array having a plurality of antenna array elements is referred to as an antenna for short. Therefore, each antenna can form analog beamforming. In this embodiment of the present invention, an antenna, an array antenna, and a radio frequency chain have a same meaning in expression; and a sector, a beam, and an antenna weight vector (AWV) have a same meaning in expression. For example, a sector number may be interchangeably indicated by an AWV sequence number/a TRN sub-field sequence number; an antenna number may be interchangeably indicated by a radio frequency chain number (RF chain ID). An AWV sequence number is a sequence number of a TRN training sequence (such as a TRN subsequence) in a BRP packet corresponding to the AWV. A sector, a beam, and an antenna weight vector may be interchangeably indicated; and a sector number, an AWV sequence number, and a TRN sub-field sequence number may be interchangeably indicated.

It should be further understood that, in this embodiment of the present invention, the first device and the second device may work in a single channel mode, channel aggregation mode, channel bonding mode, or the like. To better support LOS MIMO, orthogonal polarization of antennas of the first device and the second device may be further combined with channel aggregation for use. In the channel aggregation mode, the first device and the second device have a plurality of independent baseband modules and their corresponding RF chains. Each baseband module and its corresponding RF chain can independently perform sending or receiving on a channel, but cannot perform sending or receiving on a plurality of channels. A plurality of baseband modules and RF chains can send/receive an orthogonal training sequence or cannot send/receive an orthogonal training sequence. In the channel aggregation mode, if a plurality of RF chains share one antenna, analog BF training does not need to be separately performed for the plurality of RF chains. If the plurality of RF chains are respectively connected to different antennas, in consideration of different positions of the antennas and a relatively large difference that may exist between channel frequency responses of a plurality of channels in channel aggregation, to obtain an accurate optimal MIMO antenna configuration through analog BF training (for example, BF training in a BRP phase), for the plurality of RF chains, the analog BF training needs to be respectively performed on different channels.

In S110, in a BF training establishment phase, the second device (using aSTA 1 as an example) generates the BF training request information. The BF training request information includes the antenna configuration information for performing the BF training for each antenna and the channel configuration information for performing the BF training on the at least one channel.

The antenna configuration information is configuration information of a MIMO transmit antenna to be used in the BF training, and may include one or more of the following information: a quantity of transmit antennas and an antenna number (Antenna ID), polarization capability information of a transmit antenna, whether an orthogonal training sequence between transmit antennas is to be used, a quantity of BRP packets sent through each transmit antenna, a number and an order of a transmit sector of each transmit antenna, a length of a training sequence carried in each BRP packet/a quantity of training sequence units (TRN-Unit) carried in each BRP packet, or the like. This is not limited in this embodiment of the present invention.

The channel configuration information includes a channel number for performing the BF training for each antenna, a channel order for performing the BF training for each antenna, information about a channel bonding or channel aggregation manner, indication information indicating whether the BF training is to be performed on all channels for each antenna, number information of a channel for performing the BF training for each antenna, and the like. This is not limited in this embodiment of the present invention.

It should be understood that, the indication information indicating whether the BF training is to be performed on all the channels of each antenna indicates whether switching to another channel is performed to continue the BF training on the another channel after the BF training is completed on a current running channel of each antenna. When running channels of receiving and sending parties of the BF training each are only a single channel, the BF training request information may not carry the channel configuration information. This is not limited in this embodiment of the present invention.

The channel number and the channel order for performing the BF training for each antenna are used to support one pair of a second device and a first device in channel aggregation in performing the BF training on two or more channels. For example, for a case in which channel aggregation is combined with MIMO, it is assumed that one pair of a second device and a first device performs 2×2-mode BF training. For 2×2-mode BF training in channel aggregation of two antennas (such as an antenna 1 and an antenna 2) and two channels (such as a channel 1 and a channel 2), a channel number and order for performing the BF training for each antenna may be expressed in the following manner:

the antenna 1: the channel 1, and the channel 2; and
the antenna 2: the channel 2, and the channel 1.

When the antenna 1 and the antenna 2 can send an orthogonal BF training sequence, the channel number and order for performing the BF training for each antenna may be expressed in the following manner:

the antenna 1: the channel 1, and the channel 2; and
the antenna 2: the channel 1, and the channel 2.

When only two channels are used in channel aggregation, the channel number for performing the BF training for each antenna and channel order information for performing the BF training for each antenna may be simplified as whether the BF training is to be performed on both the channels. This is because regardless of a training manner used by two transmit antennas and two receive antennas, transmit or receive BF training can be performed on only one of the two channels for each antenna. For example, if the training is completed on the channel 1 for the antenna 1, when information "whether the BF training is to be performed on both the channels" in configuration information of the BF training indicates that the training needs to be performed on both the channels, for the antenna 1, the channel 2 further needs to be switched to for performing the training.

It should be understood that, the channel configuration information may further include a start sending time and duration of each transmit antenna on each channel, so that the first device can map a received training sequence to a number of the transmit antenna and a channel number. The start sending time of each transmit antenna on each channel is calculated based on a sending order of each antenna on the channel and a total length of a TRN sequence sent by each antenna, and the duration is equal to a total time of sending the TRN sequence by each antenna on the channel. This is not limited in this embodiment of the present invention In S120, the STA 1 sends the BF training request information to the first device (using a STA 2 as an example).

Specifically, after generating the BF training request information, the STA 1 sends the BF training request information to the STA 2. Correspondingly, the STA 2 receives the BF training request information.

In S130, after receiving the BF training request information, the STA 2 performs the BF training on the at least one channel with the STA 1.

Specifically, the STA 2 receives the BF training request information, and starts, with the STA 1, the BF training based on the antenna configuration information and the channel configuration information that are included in the BF training request information. The STA 1 and the STA 2 may perform one or more rounds of BF training. To be specific, one round of BF training and one round of feedback are performed, or a plurality of rounds of BF training and a plurality of rounds of feedback are performed. This is not limited in this embodiment of the present invention.

In the BF training process, the STA 2 detects a channel coefficient of the BF training. After the BF training ends, the STA 2 selects one or more optimal effective channel matrices $H_{eff}$ from a plurality of MIMO channel matrices based on all detected channel coefficients and a selection criterion (such as a channel capacity or a total channel throughput). The effective channel matrix $H_{eff}$ is a channel matrix of a MIMO channel corresponding to a MIMO link, and includes a channel coefficient. A dimension of the effective channel matrix $H_{eff}$ is K×L. K and L are respectively a quantity of transmit antennas and a quantity of receive antennas. A channel coefficient $h(i_M, j_N, m)$ is a measurement result obtained by measuring, on a channel m for one receive beam $i_M$ of one receive antenna, a BF training sequence sent on one transmit beam $j_N$ of one transmit antenna. Each channel coefficient corresponds to one channel, where $i_M$ is a number of a beam of an antenna with an antenna number M, $j_N$ is a number of a beam of an antenna with an antenna number N, M=1, 2, ..., or K, N=1, 2, ..., or L, K and L are positive integers, and m is a channel number. It can be learned that in a channel aggregation mode, $H_{eff}$ is correlated to a channel, because each channel coefficient in $H_{eff}$ is correlated to the channel number m.

It should be understood that, when the channel capacity/the total channel throughput is used as the selection criterion for a transmit beam and a receive beam, a total capacity of all channels in data transmission in a channel aggregation mode should be used as a determining basis. For example, in channel aggregation, a total channel capacity of all aggregated channels should be calculated.

In S140, the STA 2 determines the first feedback information. The first feedback information includes the measurement result of the BF training, the information about the antenna corresponding to the measurement result of the BF training, the beam information of the antenna, and the channel information corresponding to the antenna.

Specifically, due to relatively high bandwidth (2.16 GHz) of a single channel in a 60 GHz band, a relatively large difference between frequencies of radio frequency devices and different channels causes a relatively large difference between channel frequency responses and between path losses. For example, a path loss caused by a difference between frequencies of different adjacent channels at the bandwidth of 2.16 GHz is only 0.3 dB to 0.9 dB, while a difference between SNRs required by MCSs of different orders is at least 1 dB. Therefore, when only a loss introduced by different channels is considered, it is insufficient to support use of different MCSs on the different adjacent channels. Main reasons for using different MCSs (or referred to as unequal MCSs) on different channels include a relatively large difference between path losses of different transmission paths and discontinuous channel aggregation. There is a one-to-one correspondence between an MCS and each of a transmission path (determined by a transmit antenna/a transmit sector/a transmit AWV) and a channel. Therefore, when an MCS of each stream is fed back, a corresponding transmit antenna ID/transmit sector ID and channel number information should also be fed back.

Figure 7:
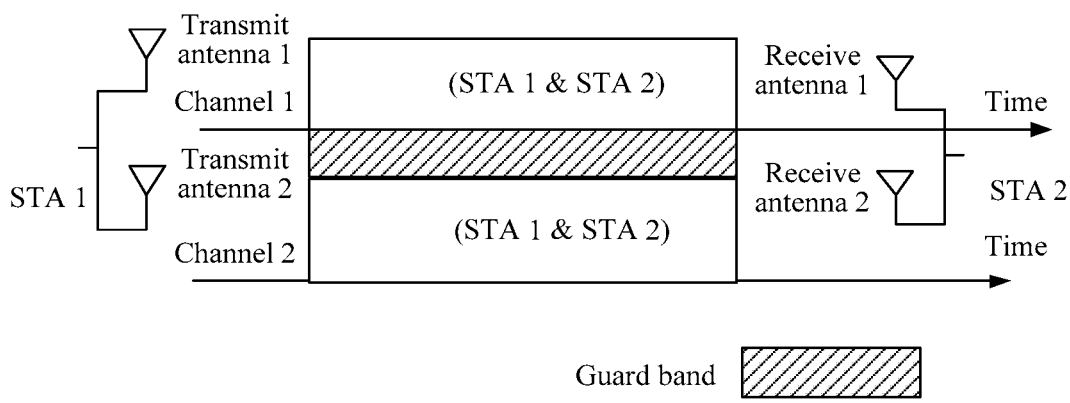
FIG. 7 is a schematic diagram of MIMO transmission in a channel aggregation transmission mode according to an embodiment of the present invention.

In S140, the STA 2 may determine, based on $H_{eff}$, a correspondence between the measurement result of the BF training and the antenna, a beam of the antenna, and a channel for performing the BF training for the antenna. Because different antennas of the STA 1 and the STA 2 are very likely to be spatially separated, for example, center points of the different antennas of the STA 1 and/or the STA 2 are separated by d1 centimeters and d2 centimeters, respectively. When the different antennas of the STA 1 and/or the STA 2 are spatially separated, because beams transmitted by the different antennas pass through different propagation paths, an optimal MIMO link is correlated with both a selected beam and a channel corresponding to the selected beam. To be specific, when $H_{eff}$ is fed back, $H_{eff}$ respectively corresponding to one or more optimal MIMO links is correlated to a beam and a channel. A correspondence between a transmit antenna (including a transmit beam), a receive antenna (including a receive beam), and a channel and CSI needs to be determined. FIG. 7 is a schematic diagram of MIMO transmission in a channel aggregation transmission mode. FIG. 7 shows transmission in 2×2 MIMO mode. Each antenna of the STA 1 and the STA 2 corresponds to one independent radio frequency chain and baseband module. The STA 1 and the STA 2 perform transmission on the channel 1 and the channel 2 respectively. There is a guard band between the channel 1 and the channel 2. For the transmission mode shown in FIG. 7, the correspondence between a transmit antenna (including a transmit beam), a receive antenna (including a receive beam), and a channel and CSI needs to be determined. $H_{eff}$ may be expressed by a formula (1):

$$H_{eff} = \begin{pmatrix} h_{11} & h_{12} \\ h_{21} & h_{22} \end{pmatrix} \qquad (1)$$

where in the formula (1), $h_{11}$ indicates a channel coefficient of a transmit antenna 1 on the channel 1, measured by a receive antenna 1, and $h_{22}$ indicates a channel coefficient of a transmit antenna 2 on the channel 2, measured by a receive antenna 2. For the MIMO transmission mode shown in FIG. 7, $h_{12}$ and $h_{21}$ are 0, because the receive antenna 1 and the receive antenna 2 respectively work on different channels, and cannot receive a signal from the other channel. In this case, for the MIMO transmission mode shown in FIG. 7, $H_{eff}$ may be expressed by a formula (2):

$$H_{eff} = \begin{pmatrix} h(i_1, j_1, 1) & 0 \\ 0 & h(i_2, j_2, 2) \end{pmatrix} \qquad (2)$$

where in the formula (2), a channel coefficient $h(i_1,j_1,1)$ indicates a channel coefficient of a transmit beam $j_1$ of the transmit antenna 1 and a receive beam $i_1$ of the receive antenna 1 on the channel 1, and a channel coefficient $h(i_2,j_2,2)$ indicates a channel coefficient of a transmit beam $j_2$ of the transmit antenna 2 and a receive beam $i_2$ of the receive antenna 2 on the channel 2. Each channel coefficient corresponds to one channel. Channel coefficients are all time domain vectors. After $H_{eff}$ is determined, a channel corresponding to the channel coefficient can be determined. The STA 2 may obtain an SNR based on values of $|h_{11}|^2$ and $|h_{22}|^2$ or based on values of the measured $h_{11}$ and $h_{22}$, respectively determine an $MCS_1$/an $SNR_1$ and an $MCS_2$/an $SNR_2/CSI_1$ corresponding to $h_{11}$ and $h_{22}$, and determine channels respectively corresponding to the $MCS_1$/the $SNR_1$ and the $MCS_2$/the $SNR_2$/the $CSI_1$.

After determining the $MCS_1$/the $SNR_1$ corresponding to $h_{11}$ and the $MCS_2$/the $SNR_2$ corresponding to $h_{22}$ and determining the channels respectively corresponding to the $MCS_1$/the $SNR_1$ and the $MCS_2$/the $SNR_2$, the STA 2 may generate the first feedback information (the final feedback information) of the BF training and sends the first feedback information to the STA 1. The first feedback information includes the measurement result of the BF training, the information about the antenna corresponding to the measurement result of the BF training, the beam information of the antenna, and the channel information corresponding to the antenna.

Optionally, in an embodiment, the first feedback information further includes modulation and coding scheme information of each of the at least one channel corresponding to the measurement result of the BF training.

Specifically, the first feedback information may further include modulation and coding scheme information of a channel corresponding to an antenna on which the BF training is performed, for subsequent channel selection based on the modulation and coding scheme information of the channel, and the like, to increase feedback accuracy, and improve efficiency of subsequent information or data transmission.

For example, for the transmission mode in FIG. 7, the first feedback information may be (the $MCS_1$/the $SNR_1/h_{11}$, the antenna 1, and a transmit sector 1 and the channel 1 corresponding to the antenna 1) and (the $MCS_2$/the $SNR_2$/$h_{22}$, the antenna 2, and a transmit sector 2 and the channel 2 corresponding to the antenna 2).

It should be understood that, the first feedback information may be fed back to the STA 1 in a form of a table. For example, Table 1 is an optimal MIMO configuration table, for the channel aggregation mode of feedback information having two optimal MIMO configurations.

TABLE 1

| Optimal MIMO configuration in a channel aggregation mode | | | | |
|---|---|---|---|---|
| Sequence number of an optimal MIMO configuration | Antenna number | Sector/ AWV number | Suggested MCS/ measured CSI | Channel number |
| 1 | Antenna 1 | Transmit sector/ AWV number X1 | $MCS_1/SNR_1$/ channel response 1 | 1 |
|   | Antenna 2 | Transmit sector/ AWV number X2 | $MCS_2/SNR_2$/ channel response 2 | 2 |

TABLE 1-continued

| Optimal MIMO configuration in a channel aggregation mode | | | | |
|---|---|---|---|---|
| Sequence number of an optimal MIMO configuration | Antenna number | Sector/ AWV number | Suggested MCS/ measured CSI | Channel number |
| 2 | Antenna 1 | Transmit sector/ AWV number X1 | $MCS_1/SNR_1$/ channel response 1 | 1 |
|   | Antenna 2 | Transmit sector/ AWV number X2 | $MCS_2/SNR_2$/ channel response 2 | 2 |

The first feedback information may be fed back in a form of Table 1. To be specific, in the first feedback information, the measurement result of the BF training is mapped to a number of the transmit antenna, a beam number of the transmit antenna, and a channel number for performing the BF training for the transmit antenna.

It should be understood that, Table 1 is merely an example indicating a final feedback. The combination in Table 1 merely describes a correspondence between content of the feedback, and the content may be placed in a message (for example, a new EDMG channel measurement report element is defined) and fed back together, or may be independently fed back in different messages at different time, provided that the correspondence between the content in the combination of feedback information can be identified. This is not limited in this embodiment of the present invention.

In S150, the first device (the STA 2) sends the first feedback information to the second device (the STA 1).

In S160, the second device determines the optimal MIMO configuration and/or the digital domain BF precoding information of the BF training based on the first feedback information, thereby better using the optimal MIMO configuration and/or the digital domain BF precoding information for data transmission, and improving data transmission efficiency. The digital domain BF precoding information is coding information calculated by the first device of the BF training based on the effective channel matrix $H_{eff}$, for example, a coding matrix obtained by performing singular value decomposition on $H_{eff}$.

Based on the beamforming training method provided in this embodiment of the present invention, due to relatively high bandwidth (2.16 GHz) of a single channel in a 60 GHz band, a relatively large difference between frequencies of radio frequency devices and different channels causes a relatively large difference between channel frequency responses and between path losses. Therefore, a transmit antenna configuration corresponding to a link with highest link quality includes corresponding channel information, so that when a beamforming training feedback includes an antenna configuration with highest link quality, especially in a MIMO application scenario of channel aggregation and/or orthogonal polarization, the transmit antenna and the transmit sector (the transmit beam) may be mapped to a channel that should be configured for the transmit antenna, and the SNR/the MCS/the CSI. Therefore, the sending device of the BF training sequence can obtain, from the feedback information, not only the antenna configuration corresponding to the optimal link with the highest link quality but also the channel configuration corresponding to each antenna, to be specific, learn of the antenna configuration on each channel, thereby achieving a maximum channel capacity/a maximum reachable rate.

Optionally, in an embodiment, the BF training request information further includes indication information used to indicate whether the BF training is to be performed on all channels.

Specifically, when the BF training is performed in a channel aggregation mode, because a plurality of channels are used in channel aggregation, the BF training request information further includes the indication information used to indicate whether the BF training is to be performed on all the channels. For each antenna of the STA 1 and the STA 2, whether the training is to be performed on both the channels needs to be determined according to the indication information. A specific method may be: adding a countdown (Count Down) field to each BRP packet, and setting an initial value of the countdown field to a quantity of all BRP packets sent on one channel, where the quantity of BRP packets may be calculated based on "a quantity of BRP packets sent by each transmit antenna" in the configuration information of the BF training, and the like. After all beam training indicated by the configuration information of the BF training is completed on one channel, to be specific, when the countdown field indicates 0, the STA 2 may send second feedback information (intermediate feedback information), and each antenna of the STA 1 and/or the STA 2 is switched to the other channel, to continue the BF training on the other channel.

It should be understood that, for the channel aggregation mode, the STA 1 and the STA 2 may perform one round of BF training, or may perform a plurality of rounds of BF training. Descriptions are separately provided below.

Figure 8:
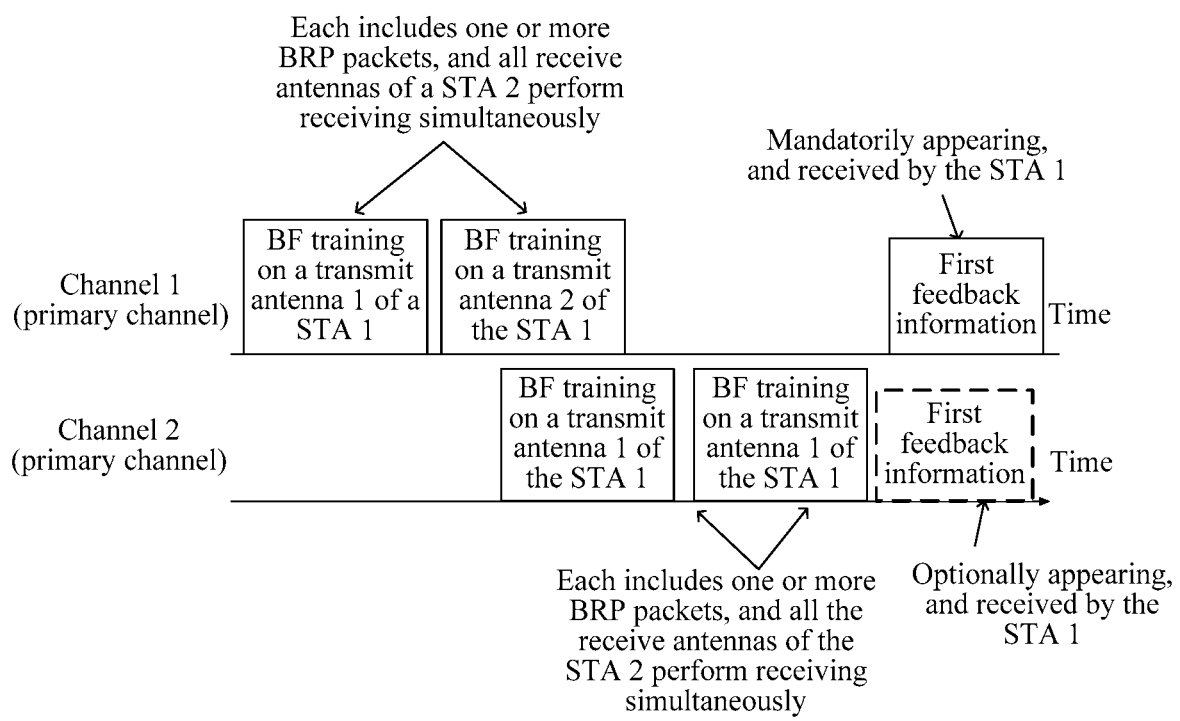
FIG. 8 is a schematic diagram of final feedback information of BF training in a channel aggregation mode when there are two different transmit antennas according to an embodiment of the present invention.

For the channel aggregation mode, when the STA 1 and the STA 2 perform one round of BF training, the BF training may implicitly indicate, in a manner in which the STA 1 and the STA 2 pre-agree on a sending order, a sending order of each antenna (indicated by an antenna ID or a radio frequency chain ID) on each channel. For example, the STA 1 and the STA 2 successively perform the BF training on a plurality of channels in a channel order based on an ascending order of channel numbers. FIG. 8 is a schematic diagram of first feedback information of BF training in channel aggregation when there are two different transmit antennas according to an embodiment of the present invention. As shown in FIG. 8, the STA 1 has two transmit antennas, and the STA 2 has two receive antennas. For a channel 1 and a channel 2 in the channel aggregation, the channel 1 is a primary channel, and the channel 2 is a secondary channel. The initiator STA 1 first performs the BF training on the channel 1 having a smaller channel number for the transmit antenna 1 and the transmit antenna 2, and both the receive antennas of the responder STA 2 are measured on the channel 1. Then, the STA 1 performs the BF training on the channel 2 having a larger channel number for the transmit antenna 1 and the transmit antenna 2, and both the receive antennas of the STA 2 are measured on the channel 2. After completing the BF training on both the channels in channel aggregation, the STA 2 feeds back first feedback information for the foregoing entire BF training process. The first feedback information sent by the STA 2 is mandatorily sent on the primary channel, and optionally sent on the secondary channel. A transmit antenna, a transmit sector (a transmit beam), and a channel of the transmit antenna in the first feedback information correspond to an SNR/an MCS/CSI measured by the first device.

Optionally, in an embodiment, before receiving the first feedback information, the second device receives second feedback information sent by the first device, where the second feedback information includes a measurement result that is obtained when the BF training needs to be performed on a plurality of channels for each antenna and that is corresponding to a channel on which the BF training has been completed.

For the channel aggregation mode, when the STA 1 and the STA 2 perform a plurality of rounds of BF training, before the STA 2 sends the first feedback information to the STA 1, the STA 2 sends the second feedback information (the intermediate feedback information) to the STA 1. The second feedback information includes the measurement result on the channel on which the BF training has been completed.

Figure 9:
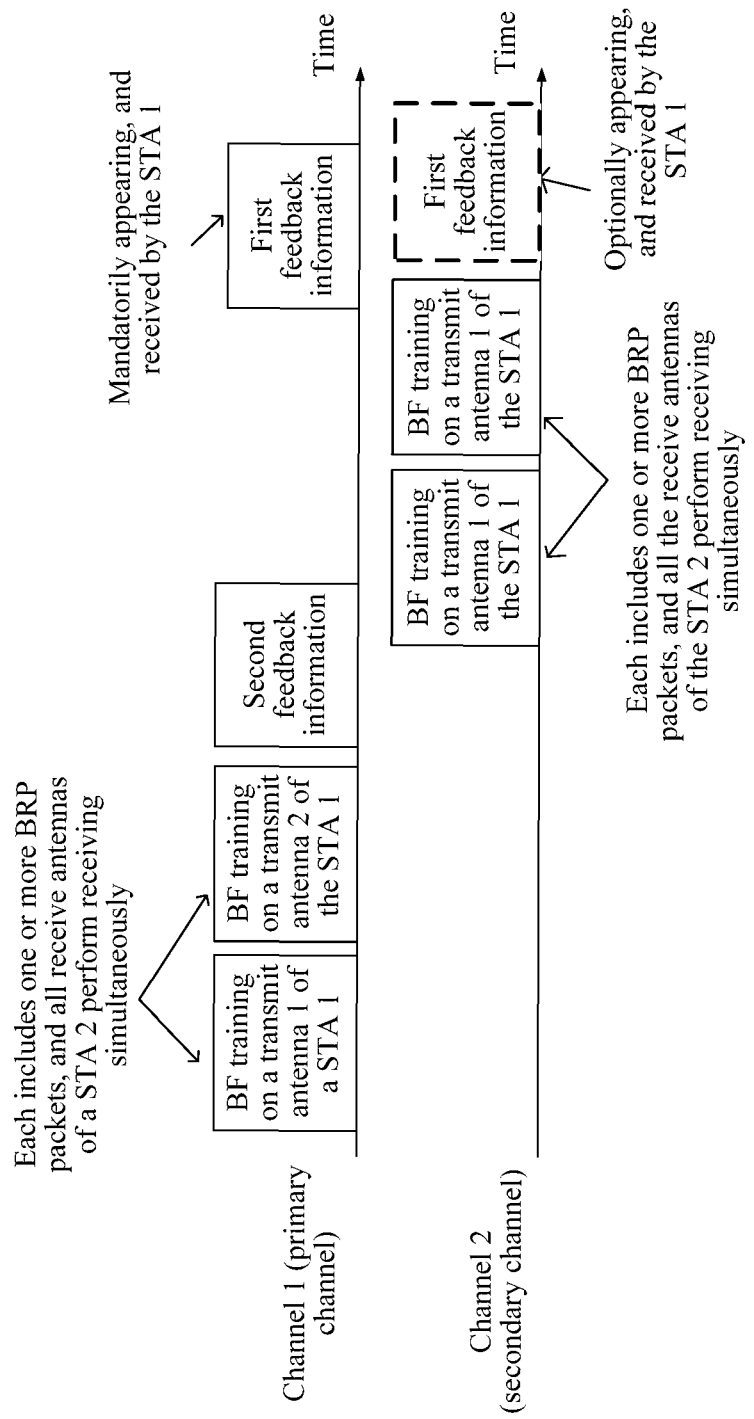
FIG. 9 is a schematic diagram of second feedback information and first feedback information of a plurality of rounds of BF training in a channel aggregation mode according to an embodiment of the present invention.

Specifically, before the STA 2 feeds back the first feedback information, a plurality of iterations may exist for the BF training. To be specific, a plurality of rounds of BF training are performed. A feedback (second feedback information) of BF training results in these intermediate iterations includes a measurement result for each TRN of a BRP packet, but does not include the first feedback information. FIG. 9 is a schematic diagram of second feedback information and first feedback information of a plurality of rounds of BF training in a channel aggregation mode according to an embodiment of the present invention. In FIG. 9, the STA 1 has two transmit antennas. For a channel 1 and a secondary channel 2 in channel aggregation, the channel 1 is a primary channel, and the channel 2 is a secondary channel. Two receive radio frequency chain of the STA 2 share one receive antenna. Because the STA 1 first performs BF training in a BRP phase on the channel 1, after the BF training on the channel 1 is completed, the STA 2 feeds back information about an optimal transmit beam for the transmit antenna 1 and the transmit antenna 2 of the STA 1 on the channel 1, to be specific, sends second feedback information to the STA 1. The second feedback information includes numbers of one or more transmit beams with optimal quality (namely, a number of an optimal AWV) and/or a signal-to-noise ratio or received signal strength of the one or more transmit beams with the optimal quality. After the STA 1 receives the second feedback information, because the STA 1 has the information about the optimal transmit beam on the channel 1, when the STA 1 performs the BF training in the BRP phase again on the channel 2, a quantity of transmit beams on which the training is performed on the channel 2 can be greatly reduced based on the existing information about the optimal transmit beam on the channel 1 according to a principle that there is a high similarity between optimal transmit beams on the channel 2 and the channel 1, thereby greatly reducing duration of a sent BF training sequence. A feedback 1 and a feedback 2 in FIG. 9 are respectively the second feedback information and the first feedback information in the BF training process. The second feedback information includes the transmit beam with the optimal quality of the transmit antenna 1 and the transmit antenna 2 of the STA 1 on the channel 1.

It should be understood that, the first feedback information and the second feedback information may be carried in a BRP frame, for example, included in a channel measurement feedback element or an EDMG channel measurement feedback element in the BRP frame.

Figure 10:
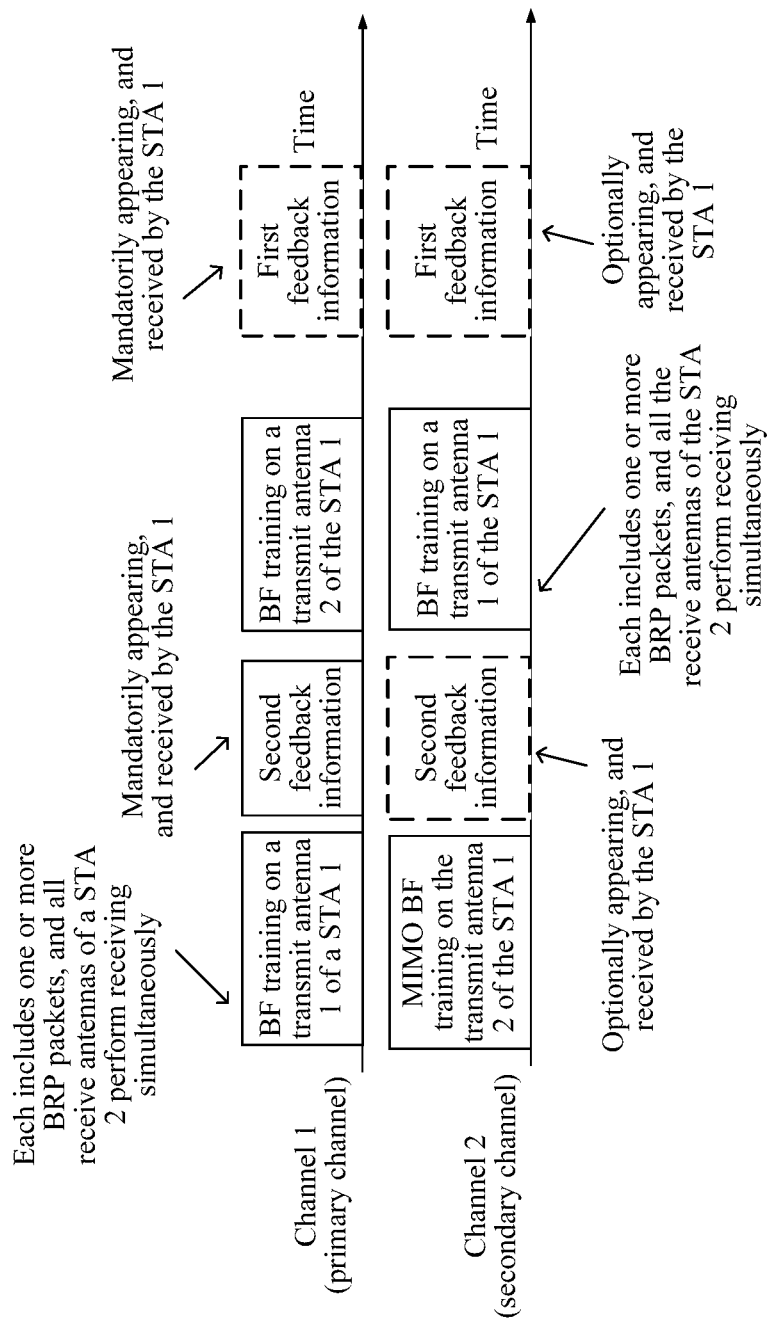
FIG. 10 is a schematic diagram of second feedback information of a plurality of rounds of BF training in a channel aggregation mode according to another embodiment of the present invention.

FIG. 10 is a schematic diagram of second feedback information and first feedback information of a plurality of rounds of BF training in a channel aggregation mode according to another embodiment of the present invention. In FIG. 10, a STA 1 has two transmit antennas, and a STA 2 has two receive antennas. For a channel 1 and a secondary channel 2 in channel aggregation, a channel 1 is a primary channel, and a channel 2 is a secondary channel. The STA 1 has two different transmit antennas, and the STA 2 has two receive antennas. Because the BF training is separately performed on the channel 1 for the antenna 1 of the STA 1 and the channel 2 for the antenna 2 of the STA 1, after the BF training on the channel 1 and the channel 2 ends, the STA 2 on the primary channel, second feedback information for the BF training performed on each of the channel 1 and the channel 2. After the second feedback information is sent completely, because for the two transmit antennas, the other channel (channel switching) needs to be switched to for performing the BF training, after the BF training is performed on both the channels for each antenna, the STA 2 sends, on the primary channel, first feedback information for the BF training performed on both the channels for each antenna.

It should be understood that, the second feedback information and the first feedback information need to be sent on the primary channel, and may be sent or not sent on the secondary channel. This is not limited in this embodiment of the present invention.

Optionally, in an embodiment, when the BF training is performed in a channel aggregation mode, the second feedback information is sent to the second device when channel switching is performed for the BF training.

Specifically, for the BF training that is in the channel aggregation mode and in which there is the second feedback information, for example, the BF training that is shown in FIG. 9 and FIG. 10 and in which there is the second feedback information, the STA 2 may send the second feedback information to the STA 1 when channel switching is performed for the BF training. For example, after the BF training on the channel 1 for both the antennas of the STA 1 ends, before the BF training is performed on the channel 2 for both the antennas of the STA 1, to be specific, within a time of channel switching for the antenna of the STA 1, the STA 2 sends the second feedback information to the STA 1.

Optionally, in an embodiment, when the BF training needs to be performed on a plurality of beams of one antenna, the BF training request information further includes sequence number information of a plurality of Beam Refinement Protocol BRP packets used to perform the BF training on a plurality of beams of at least one antenna and length information of a training sequence in each BRP packet; and the measurement result of the BF training includes sequence number information of a Beam Refinement Protocol BRP packet corresponding to each beam indicated by the beam information, and length information of a training sequence in the BRP packet.

When the BF training needs to be performed on a plurality of beams of one antenna, to be specific, when there are a relatively large quantity of AWVs of one antenna, because each antenna may use training sequences of a plurality of BRP packets for performing the BF training, the BF training request information further includes sequence number information of a plurality of Beam Refinement Protocol BRP packets for performing the BF training on the plurality of beams and length information of a training sequence in each of the BRP packets. In the first feedback information, the measurement result of the BF training further includes sequence information of the BRP packet corresponding to each of the plurality of beams and length information of a training sequence in the BRP packet. Therefore, when one or more optimal AWV numbers are fed back, a sequence number of a BRP packet corresponding to the AWV number should also be fed back, for example, (antenna 1, BRP 2, AWV 10) indicates that for the antenna 1, an AWV corresponding to a 10th TRN sub-field of a second BRP packet has optimal received quality. It should be understood that, in intermediate feedback information after each round of BF training ends, one or more AWV sequence numbers may be fed back. For example, feedback information for an antenna Z is: (antenna Z, BRP 1, AWV a, AWV b ..., BRP 2, AWV c), and a plurality of AWV sequence numbers may be used to indicate a beam start point in a next round of finer BF training, or may be used to determine an optimal antenna beam configuration in a final round of BF training, or may be used as a candidate beam for subsequent beam tracking.

Optionally, in an embodiment, the measurement result of the BF training includes a signal-to-noise ratio SNR of the BF training, channel state information of a channel on which the BF training is performed, and a modulation and coding scheme MCS of the channel on which the BF training is performed.

Specifically, when the STA 1 and the STA 2 perform the BF training, the STA 2 may determine the signal-to-noise ratio SNR of the BF training based on a measured channel coefficient and may feed back a suggested MCS, which is used to determine an optimal MIMO channel configuration.

It should be understood that, the measurement result of the BF training may further include other CSI or information correlated to an antenna, a beam, and a channel used for the BF training. For example, the other CSI information includes a channel impulse response (in a case of single-input single-output) of each channel or a channel matrix of each channel (in a case of MIMO). This is not limited in this embodiment of the present invention.

An embodiment of the present invention further provides a beamforming training method 200. The method 200 may be applied to the scenario shown in FIG. 4, and certainly, may also be applied to another communication scenario. This is not limited in this embodiment of the present invention.

Figure 11:
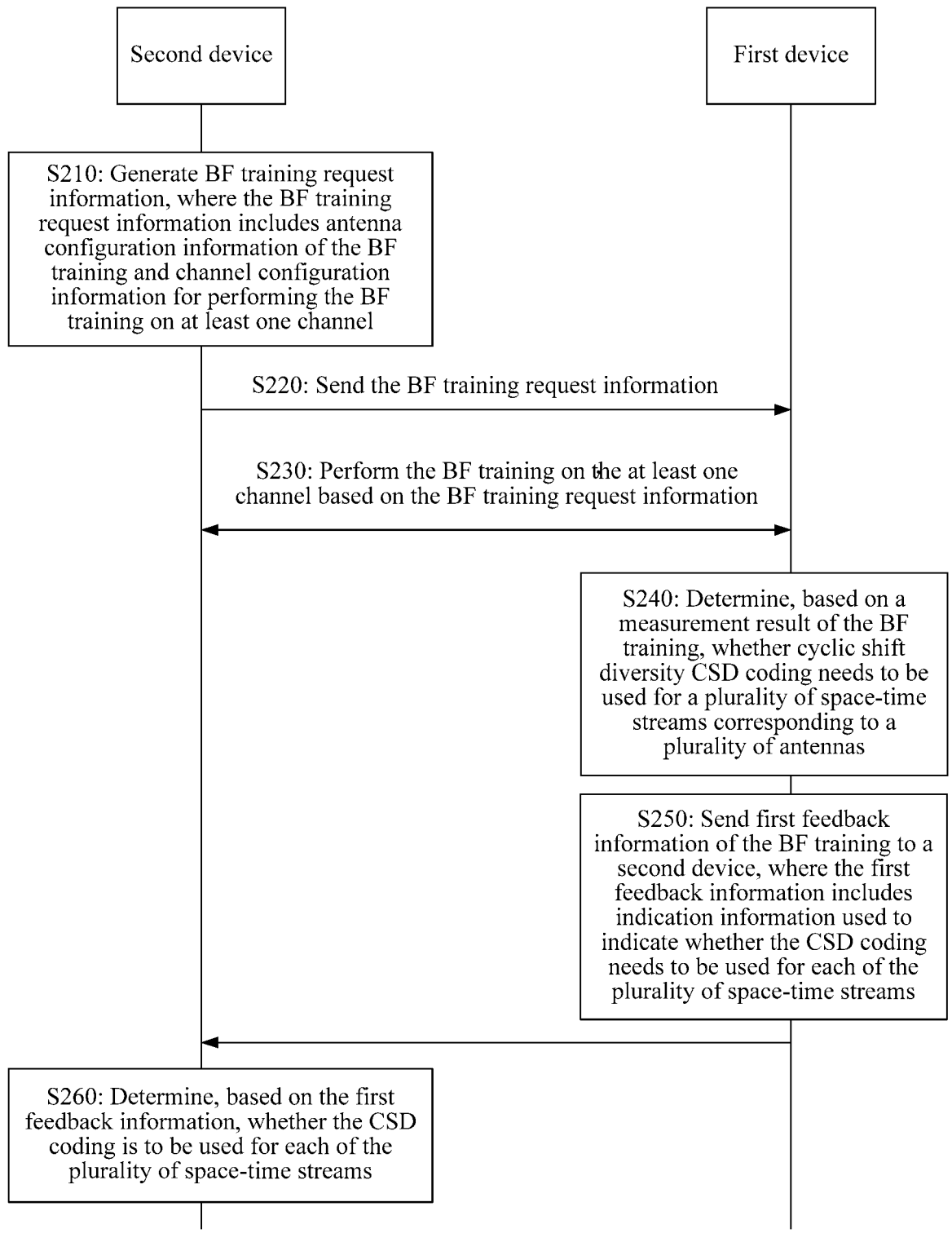
FIG. 11 is a schematic flowchart of a beamforming training method according to another embodiment of the present invention.

As shown in FIG. 11, the method 200 includes the following steps:

S210: A second device generates BF training request information, where the BF training request information includes antenna configuration information of the BF training and channel configuration information for performing the BF training on at least one channel.

S220: The second device sends the BF training request information to a first device.

S230: The second device performs the BF training on the at least one channel with the first device based on the BF training request information.

S240: The first device determines, based on a measurement result of the BF training, whether cyclic shift diversity CSD coding needs to be used for a plurality of space-time streams corresponding to a plurality of antennas.

S250: The first device sends first feedback information of the BF training to the second device, where the first feedback information includes indication information used to indicate whether the CSD coding needs to be used for each of the plurality of space-time streams.

S260: The second device determines, based on the first feedback information, whether the CSD coding is to be used for each of the plurality of space-time streams.

Specifically, a process of interaction between an initiator (the second device) and a responder (the first device) of the BF training in time is shown in FIG. 6. Each round of BF training includes BF training request information sent by the initiator (the second device) and feedback information sent by the responder (the first device). To negotiate a MIMO mode for working, before performing the BF training, the initiator and the responder need to configure a training mode and a parameter for a BF training process through a BF establishment process. After completing BF establishment, the initiator and the responder perform one or more rounds of MIMO BF training. A plurality of rounds of BF training help the initiator accelerate alignment of beams between a plurality of receive and transmit antennas based on feedback information during the process, and accelerate obtaining of an optimal MIMO simulation antenna configuration. N is a positive integer. For example, when N=1, it indicates that the initiator and the responder perform only one round of BF training.

In S210, in a BF training establishment phase, the second device (using a STA 1 as an example) generates the BF training request information. The BF training request information includes the antenna configuration information for performing the BF training for each antenna and the channel configuration information for performing the BF training for each antenna. The antenna configuration information is configuration information of a MIMO transmit antenna to be used in the BF training, and may include one or more of the following information: a quantity of transmit antennas and an antenna number (Antenna ID), polarization capability information of a transmit antenna, whether an orthogonal training sequence between transmit antennas is to be used, a quantity of BRP packets sent through each transmit antenna, a number and an order of a transmit sector of each transmit antenna, a length of a training sequence carried in each BRP packet/a quantity of training sequence units (TRN-Unit) carried in each BRP packet, or the like. The channel configuration information includes a channel number for performing the BF training for each antenna, a channel order for performing the BF training for each antenna, information about channel bonding or channel aggregation, indication information indicating whether the BF training is to be performed on all channels for each antenna, and the like. This is not limited in this embodiment of the present invention.

In S220, the STA 1 sends the BF training request information to the first device (using a STA 2 as an example).

Specifically, after generating the BF training request information, the STA 1 sends the BF training request information to the STA 2. Correspondingly, the STA 2 receives the BF training request information.

In S230, the second device performs the BF training on the at least one channel with the first device based on the BF training request information.

Specifically, the STA 2 receives the BF training request information, and starts, with the STA 1, the BF training based on the antenna configuration information and the channel configuration information that are included in the BF training request information. The STA 1 and the STA 2 may perform one or more rounds of BF training. To be specific, one round of BF training and one round of feedback are performed, or a plurality of rounds of BF training and a plurality of rounds of feedback are performed. This is not limited in this embodiment of the present invention.

In S240, the first device determines, based on the measurement result of the BF training, whether the cyclic shift diversity CSD needs to be used for the plurality of space-time streams corresponding to the plurality of antennas.

Specifically, the STA 2 determines an effective channel matrix based on the BF training. The effective channel matrix includes a plurality of elements, and each of the plurality of elements is used to indicate a measurement result of the BF training on one channel for one beam of one antenna.

In the BF training process, the STA 2 detects a channel coefficient of the BF training. After the BF training ends, the STA 2 selects one or more optimal effective channel matrices $H_{eff}$ from a plurality of MIMO channel matrices based on all detected channel coefficients and a selection criterion (such as a channel capacity or a total channel throughput). The effective channel matrix $H_{eff}$ is a channel matrix of a MIMO channel corresponding to a MIMO space-time stream, and includes a channel coefficient. A dimension of the effective channel matrix $H_{eff}$ is K×L. K and L are respectively a quantity of transmit antennas and a quantity of receive antennas. A channel coefficient $h(i_M, j_N, m)$ is a measurement result obtained by measuring, on a channel m for one receive beam $i_M$ of one receive antenna, a BF training sequence sent on one transmit beam $j_N$ of one transmit antenna. Each channel coefficient corresponds to one channel, where $i_M$ is a number of a beam of an antenna with an antenna number M, $j_N$ is a number of a beam of an antenna with an antenna number N, M=1, 2, . . . , or K, N=1, 2, . . . , or L, K and L are positive integers, and m is a channel number.

It should be understood that, the measurement result of the BF training includes an antenna configuration with highest link quality, and information between a correspondence between each antenna and a channel. For example, the measurement result includes not only the measurement result of the BF training, but also configuration information of an antenna corresponding to the measurement result of the BF training, beam information of the antenna, information about a channel corresponding to the antenna, modulation and coding scheme information of the channel, and the like. This is not limited in this embodiment of the present invention. The antenna configuration information is used to indicate antennas that form a link with highest link quality. The beam information of the antenna refers to a beam that should be used by each of the antennas forming the link with the highest link quality. The information about the channel corresponding to the antenna refers to a channel on which a radio frequency chain corresponding to the antenna should be configured to run. For example, if channel information corresponding to an antenna 1/a radio frequency chain 1 and included in the measurement result is a channel 1, it means that the antenna 1/the radio frequency chain 1 needs to be configured to run on the channel 1. The modulation and coding scheme information of the channel refers to a modulation and coding scheme that should be used on each channel. Because different channels may be subject to attenuation or interference having a relatively large difference, different modulation and coding schemes are used on different channels to flexibly achieve a maximum reachable rate of each channel, thereby achieving a maximum channel capacity during channel aggregation.

In S240, the first device determines, based on the measurement result, whether the cyclic shift diversity CSD needs to be used for the plurality of space-time streams corresponding to the plurality of antennas.

The STA 2 may determine, based on the measurement result, for example, based on $H_{eff}$ in the measurement result, whether the plurality of space-time streams (namely, a plurality of streams) corresponding to the plurality of antennas are correlated, and if the plurality of streams are correlated, determine that the CSD needs to be used for the plurality of streams, or if the plurality of streams are not correlated, determine that the CSD does not need to be used for the plurality of streams.

A method used by the STA 2 to determine whether the plurality of streams are correlated includes the following:

1. When determining, based on $H_{eff}$, that $H_{eff}$ has a non-zero value only on a diagonal, and another channel coefficient is 0 or a value less than a preset threshold and tending to 0, the STA 2 determines that the two streams are not correlated. Alternatively, when two column vectors of $H_{eff}$ are not correlated, the STA 2 determines that two streams of two transmit radio frequency chains corresponding to the two column vectors are not correlated.

2. If the STA 2 determines, based on the measurement result, dual-polarization orthogonal matching between the antennas, and there is no polarization leakage, streams between the STA 1 and the STA 2 that correspond to the antennas are not correlated. For example, both the STA 1 and the STA 2 are configured with dual-polarized antennas, and the STA 1 sends two preset BF training sequences TRN1 and TRN2 through horizontal polarization and vertical polarization respectively, where TRN1 and TRN2 are mutually orthogonal sequences. If a receiving result of the STA 2 based on horizontal polarization and vertical polarization shows that in each polarization manner, a training sequence sent in only one polarization manner can be received, for example, each of a horizontal polarization antenna and a vertical polarization antenna of the STA 2 can receive only one of TRN1 and TRN2, it is considered that the two streams TRN1 and TRN2 sent by the STA 1 are not correlated.

3. The STA 2 determines, based on the measurement result, that different antennas work in a channel aggregation manner, and transmit or receive RF chains work on different channels to form a working manner of frequency division multiplexing. Because each receive chain of the first device receives only a signal of one stream on a current channel, no beamforming effect between a plurality of streams occurs, and no CSD is required.

Specifically, a correlation value may be used to indicate a degree of correlation between different streams and determine whether they are correlated. A correlation value is used to evaluate a degree of correlation between TRN sequences of different streams. When a value of a correlation between two streams is greater than a preset value, it is proved that the two streams are correlated, and the CSD needs to be used; or when a value of a correlation between two streams is less than a preset value, it is proved that the two streams are not correlated and the CSD does not need to be used. For example, a correlation operation is performed on different column vectors of $H_{eff}$ to obtain a value of a correlation between streams corresponding to the column vectors.

It should be understood that, for a case in which a plurality of antennas all use dual polarization, the CSD does not need to be used for a plurality of streams of orthogonal polarization between different antennas, and the CSD needs to be used for beam transmit streams between different antennas that are polarized in a same manner.

In S250, the first device sends the first feedback information of the BF training to the second device. The first feedback information includes the indication information used to indicate whether the CSD coding needs to be used for each of the plurality of space-time streams.

Specifically, the STA 2 generates the first feedback information of the BF training. The STA 2 determines, based on the effective channel matrix $H_{eff}$, whether the CSD needs to be used for the plurality of streams. Therefore, the first feedback information includes the indication information used to indicate whether the CSD needs to be used for each of the plurality of space-time streams.

In S260, the second device determines, based on the first feedback information, whether the CSD is to be used for each of the plurality of space-time streams.

Specifically, the STA 1 determines, according to the indication information in the first feedback information, whether the CSD is to be used for each of the plurality of space-time streams. After whether the CSD is to be used for each space-time stream is determined, during subsequent communication with the STA 2, whether the CSD is to be used may be determined, thereby increasing a packet detection rate of a legacy STA and a decoding success rate of an L-Header field in a PPDU.

Based on the beamforming training method provided in this embodiment of the present invention, whether the plurality of streams corresponding to the plurality of antennas are correlated is determined based on the effective channel matrix of the BF training; and if the plurality of streams are correlated, it is determined that the CSD needs to be used for the plurality of streams; or if the plurality of streams are not correlated, it is determined that the CSD does not need to be used for the plurality of streams. The first feedback information includes the indication information indicating whether the CSD coding needs to be used for each of the plurality of space-time streams. It is determined, based on the indication information, that the CSD is to be used for different streams, to help increase the packet detection rate of the legacy STA and the decoding success rate of the L-Header field in a PPDU.

It should be understood that, the indication information indicating whether the CSD is to be used may be carried in a channel measurement feedback element or an EDMG channel measurement feedback element in a BRP frame.

It should be understood that, the indication information may feed back, to the STA 1 in a form of a table, whether the CSD coding needs to be used. Table 2 is an optimal MIMO configuration table of feedback information having two optimal MIMO configurations and carrying indication information for the channel aggregation mode.

TABLE 2

Table of optimal MIMO configuration carrying indication information in a channel aggregation mode

| Sequence number of an optimal MIMO configuration | Antenna number | Sector/ AWV number | Suggested MCS/ measured CSI | Channel number | Whether a CSD is to be used |
|---|---|---|---|---|---|
| 1 | Antenna 1 | Transmit sector/AWV number X1 | $MCS_1/SNR_1/$ channel response 1 | 1 | Yes/no |
|   | Antenna 2 | Transmit sector/AWV number X2 | $MCS_2/SNR_2/$ channel response 2 | 2 | Yes/no |
| 2 | Antenna 1 | Transmit sector 1/AWV number X1 | $MCS_1/SNR_1/$ channel response 1 | 1 | Yes/no |
|   | Antenna 2 | Transmit sector/AWV number X2 | $MCS_2/SNR_2/$ channel response 2 | 2 | Yes/no |

The first feedback information may be fed back in a form of Table 2. In Table 2, for each channel in channel aggregation, one piece of indication information indicating whether the CSD is to be used is added, and is used to indicate whether the CSD coding needs to be used for a space-time stream on the channel. In a final feedback, the measurement result of the BF training is mapped to the transmit antenna, a beam of the transmit antenna, and the channel configuration information for performing the BF training for the transmit antenna, and whether the CSD is to be used is indicated to the STA 1.

Optionally, in an embodiment, when a plurality of rounds of BF training are performed, before the sending, by a first device, the first feedback information, the method further includes: sending intermediate feedback information to the second device, where the intermediate feedback information includes indication information used to indicate whether the CSD needs to be used for a space-time stream corresponding to an antenna on which the BF training has been performed.

Specifically, before the STA 2 feeds back the first feedback information, a plurality of iterations may exist for the BF training. To be specific, a plurality of rounds of BF training are performed. A feedback (an intermediate feedback) of BF training results in these intermediate iterations includes the indication information indicating whether the CSD needs to be used for the space-time stream corresponding to the antenna on which the BF training has been performed.

Optionally, in an embodiment, the determining whether a cyclic shift diversity CSD needs to be used for a plurality of space-time streams corresponding to a plurality of antennas includes: when the plurality of space-time streams respectively belong to different channels, determining that the CSD is not used for the plurality of space-time streams.

If at least two of the plurality of space-time streams belong to a same channel, whether the CSD needs to be used for the at least two space-time streams is determined based on an orthogonal polarization manner of the at least two space-time streams.

Specifically, for the BF training in the channel aggregation mode, when the plurality of space-time streams (streams) respectively belong to the different channels, because the different streams are respectively located on the different channels, to be specific, transmit or receive RF chains work on the different channels, a working manner of frequency division multiplexing is formed. Because each receive chain of the STA 2 receives only a signal of one stream on a current channel, no beamforming effect between a plurality of streams occurs, and no CSD is required.

When the at least two of the plurality of streams belong to the same channel, whether the CSD needs to be used for the at least two streams needs to be determined based on the orthogonal polarization manner of the at least two streams belonging to the same channel.

Optionally, in an embodiment, the determining, when at least two of the plurality of streams belong to a same channel, based on an orthogonal polarization manner of the at least two space-time streams, whether the CSD needs to be used for the at least two space-time streams includes:

when the at least two space-time streams use a same polarization manner, determining that the at least two space-time streams are correlated; and determining, in the at least two space-time streams, a space-time stream for which the CSD needs to be used.

Specifically, data transmission is performed on one channel by using the at least two streams, and when the at least two streams use the same orthogonal polarization manner, there is a correlation between the two streams using the same orthogonal polarization manner. Therefore, the space-time stream for which the CSD needs to be used is determined in the at least two space-time streams.

Optionally, in an embodiment, the at least two first space-time stream groups use a same CSD.

Specifically, space-time streams in each first space-time stream group use a same polarization manner, and at least two first space-time stream groups have different polarization manners. Therefore, the at least two first space-time stream groups may use same CSD coding, to be specific, a plurality of first space-time stream groups use a same CSD.

It should be understood that, when the at least two streams belong to the same channel, the at least two space-time streams have different orthogonal polarization manners; and when a value of a correlation between the at least two space-time streams is less than a preset value, it is determined that the CSD does not need to be used for the at least two space-time streams.

Figure 12:
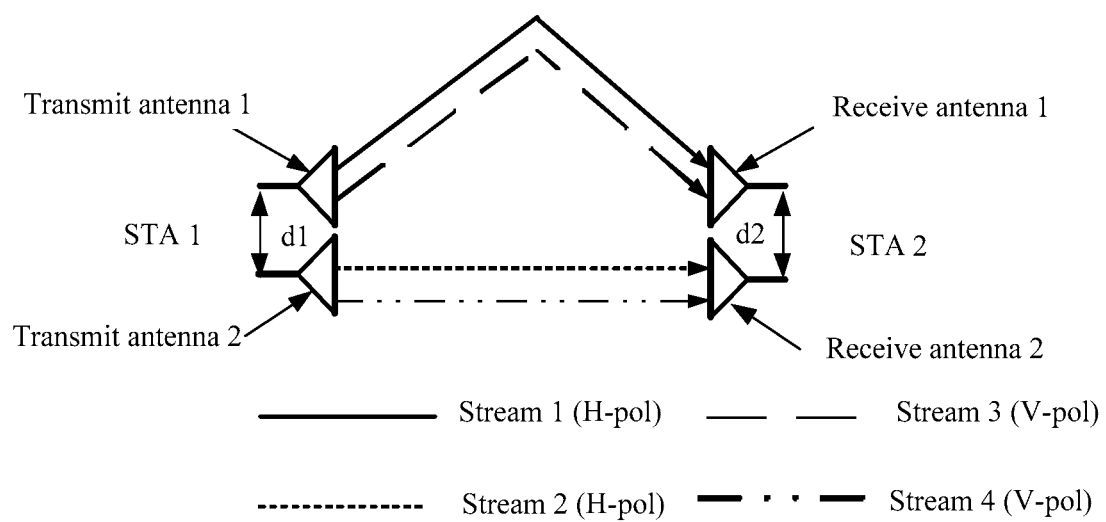
FIG. 12 is a schematic diagram of forming a 4×4 MIMO mode by a STA 1 and a STA 2 according to an embodiment of the present invention.

FIG. 12 is a schematic diagram of forming a 4×4 MIMO mode by a STA 1 and a STA 2 according to an embodiment of the present invention. As shown in FIG. 12, the STA 1 has two transmit antennas, and the STA 2 has two receive antennas. Each transmit antenna or each receive antenna has a dual polarization capability (for example, horizontal polarization, H-pol) and vertical polarization (vertical polarization, V-pol)). Each antenna corresponds to two RF chains, and each RF chain corresponds to one polarization manner of the antenna. Therefore, a 4×4 MIMO mode is formed between the STA 1 and the STA 2. A distance between the antennas of the STA 1 and a distance between the antennas of the STA 2 are respectively d1 and d2, and a value range of each of d1 and d2 is greater than or equal to 0.

For BF training in a case of channel aggregation and/or orthogonal polarization, based on a correlation between streams shown by $H_{eff}$ for each receive antenna/receive radio frequency chain, streams corresponding to all transmit antennas/transmit radio frequency chains/transmit beams having a correlation may be grouped into one group. To be specific, transmit antennas/transmit radio frequency chains/transmit beams corresponding to values that are not 0 in row vectors of $H_{eff}$ are grouped into one group. For a same receive antenna, if in a plurality of signals sent by using a plurality of transmit beams of a plurality of transmit antennas and received by the receive antenna, only one signal is not 0, and other signals are 0, to be specific, a value of only one element in row vectors of $H_{eff}$ corresponding to the receive antenna is not 0, it indicates that the plurality of transmit beams of the plurality of transmit antennas are not correlated for the receive antenna.

Figure 13:
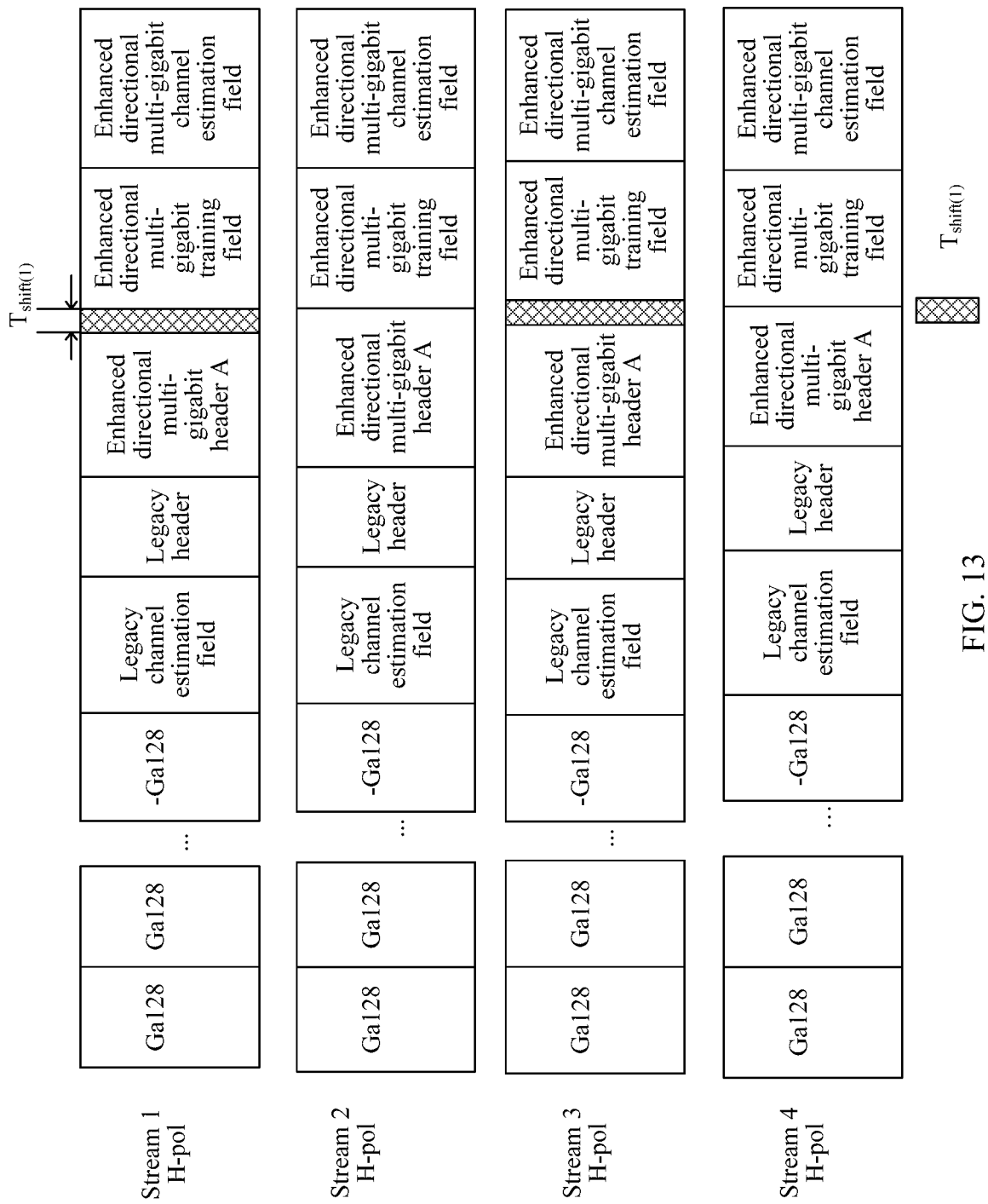
FIG. 13 is a schematic diagram of a CSD in a 4×4 MIMO mode according to an embodiment of the present invention.

For each receive antenna/receive radio frequency chain, after space-time streams (streams) having a correlation are grouped into one group, based on a quantity $N_{stream}$ of streams in a same group, a predefined CSD is to be used for a field existing in a PPDU when there is a beamforming effect on a plurality of antennas. Because streams in different groups are not correlated, a same CSD may be used for the streams in the different groups. For example, in the 4×4 MIMO mode shown in FIG. 12, a used CSD is shown in FIG. 13. FIG. 13 is a schematic diagram of a CSD in a 4×4 MIMO mode according to an embodiment of the present invention. In FIG. 13, a stream 1 and a stream 2 are correlated because of a same polarization manner, and a stream 3 and stream 4 are correlated because of a same polarization manner, so that a same CSD manner is used for the stream 1 and stream 2, and a same CSD manner is used for the stream 3 and the stream 4, and the stream 1 and the stream 2 may be grouped into one group (a first group), and the stream 3 and the stream 4 may be grouped into one group (a second group). To be specific, for one of the stream 1 and the stream 2, and one of the stream 3 and the stream 4 (for example, the stream 1 and the stream 3 in FIG. 13), a partial sequence whose length of a first Ga128 subsequence in a short training field STF is $T_{shift}(1)$ is cyclically shifted to a rear end of an EDMG-Header-A field. The other stream in the same group is not cyclically shifted. It can be learned that, a CSD is to be used for each of four streams, and four different CSD values are required: $T_{shift}(0)$, $T_{shift}(1)$, $T_{shift}(2)$, and $T_{shift}(3)$, where $T_{shift}(0)=0$, $T_{shift}(1)$, $T_{shift}(2)$, and $T_{shift}(3)$ are greater than 0, and a value range of each of $T_{shift}(1)$, $T_{shift}(2)$, and $T_{shift}(3)$ is a positive integer multiple of chip duration. Grouping is performed based on a correlation between streams, and a same CSD may be used for streams in different groups. To be specific, the first group and the second group use a same CSD. The stream 1 and the stream 3 use a same CSD. Therefore, a required CSD value is reduced to one $T_{shift}$, and CSD values is reduced by 3 when compared with that it is required in the prior art that the stream 1, the stream 2, the stream 3, and the stream 4 need to use four CSD values. After the quantity of CSD values is reduced, a maximum value of a CSD value can be reduced to a minimum value in original non-zero CSD values. Based on a reduced CSD coded value, a packet error rate/an error detection rate of a legacy STA can be reduced.

Figure 14A:
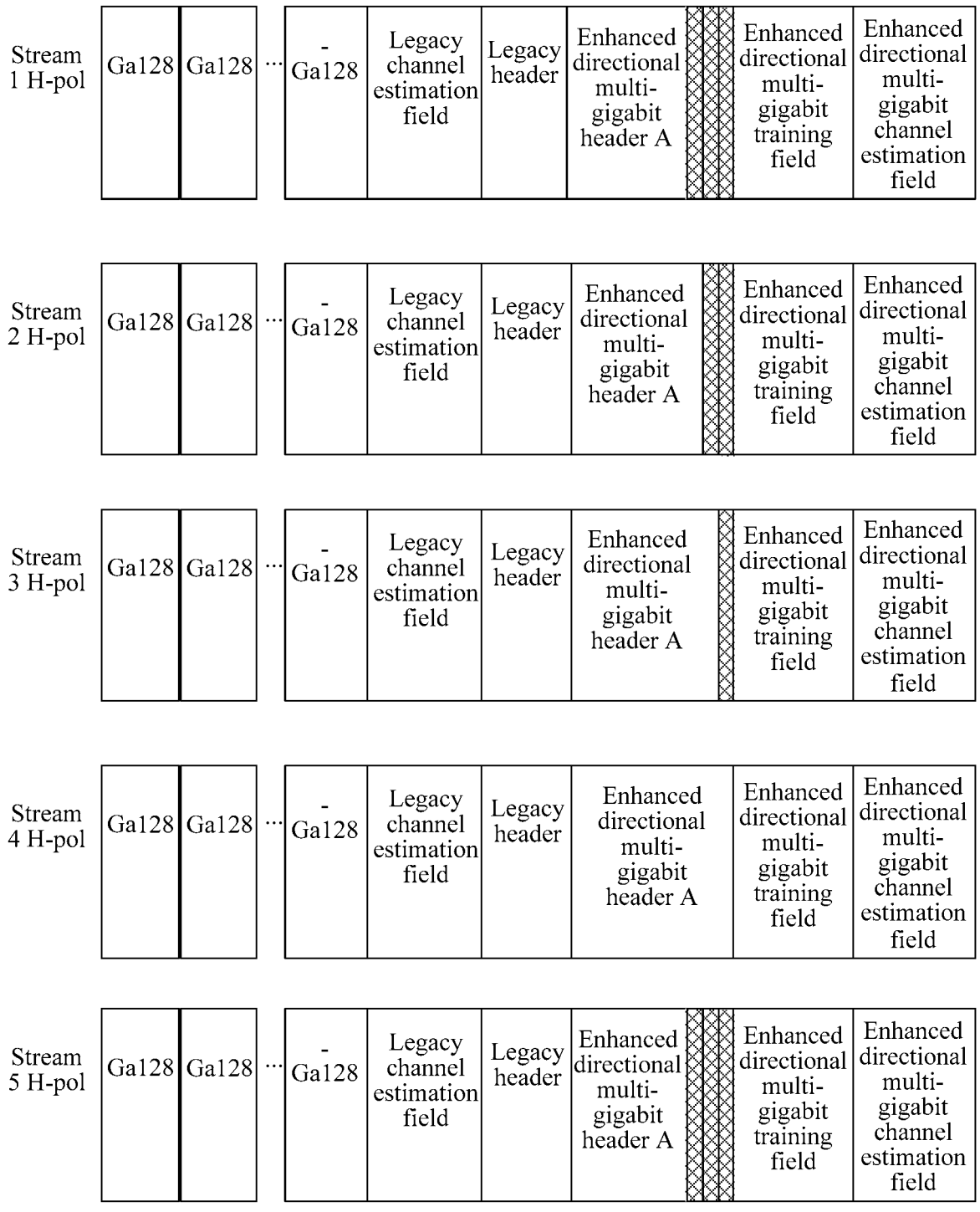
FIG. 14A and FIG. 14B are a schematic diagram of a CSD in an 8×8 MIMO mode according to an embodiment of the present invention.
Figure 14B:
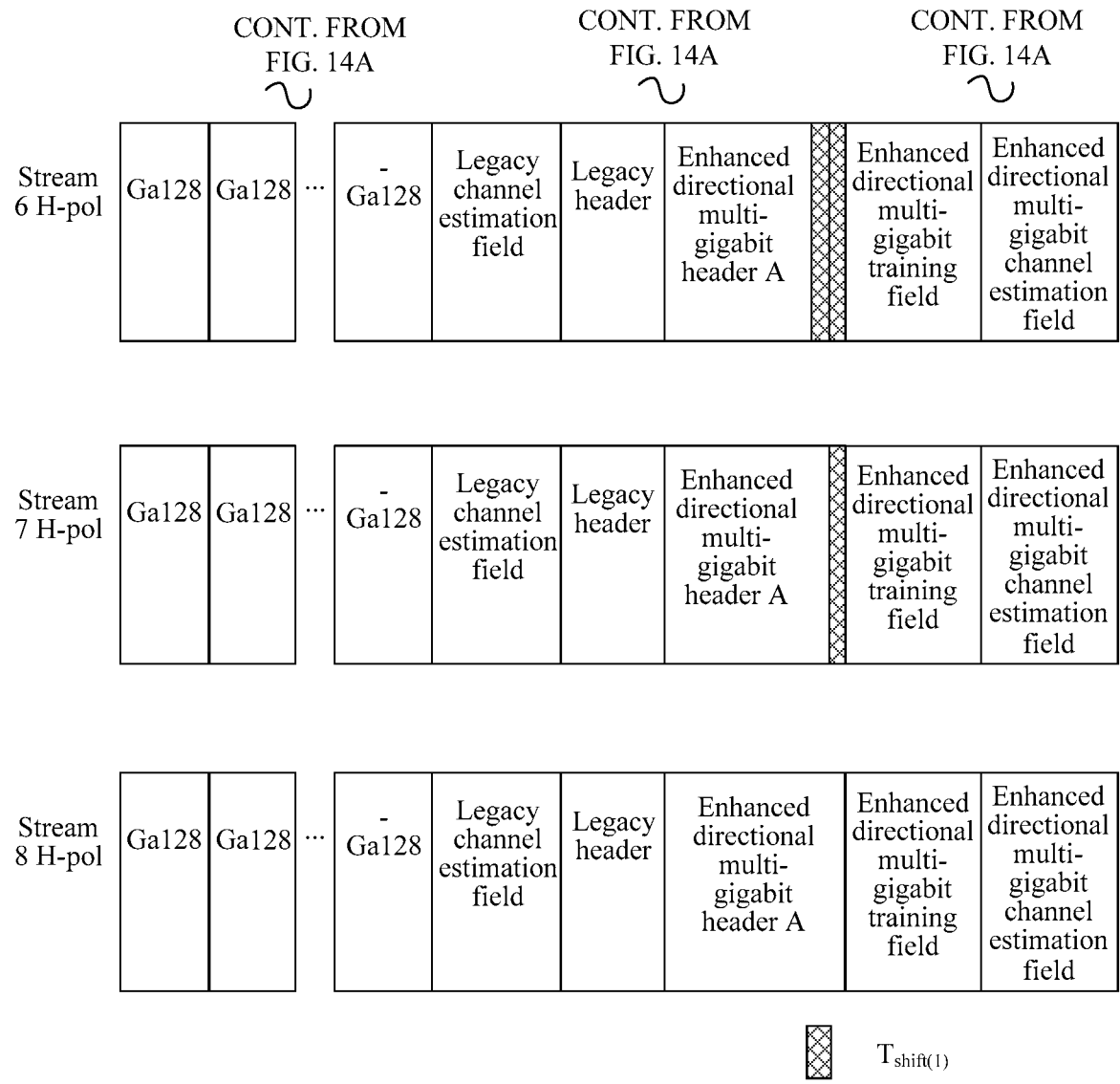

FIG. 14A and FIG. 14B are a schematic diagram of an 8×8 MIMO mode in which a CSD is used. FIG. 14A and FIG. 14B are a schematic diagram of a CSD in an 8×8 MIMO mode according to an embodiment of the present invention. In FIG. 14A and FIG. 14B, all streams of receiving and sending devices are sent on a same channel, to be specific, eight streams are all sent on the same channel. When receiving and sending parties implement orthogonal matching between dual-polarized antennas, a CSD needs to be used only for all streams in a same polarization mode (for example, H-pol or V-pol), and a quantity of CSD coded values is reduced to 4. To be specific, for four streams having a same polarization manner, namely, a stream 1 to a stream 4, four different CSD coded values are used, and four streams having a same polarization manner, namely, a stream 5 to a stream 8, CSD values the same as those used for the stream 1 to the stream 4 are used. For example, the CSD values used for the stream 1 to the stream 4 are respectively $T_{shift}(3)$, $T_{shift}(2)$, $T_{shift}(1)$, and $T_{shift}(0)$, where $T_{shift}(0)=0$, $T_{shift}(1)$, $T_{shift}(2)$, and $T_{shift}(3)$ are greater than 0, and a value range of each of $T_{shift}(1)$, $T_{shift}(2)$, and $T_{shift}(3)$ is a positive integer multiple of chip duration, and $T_{shift}(1)$ is one time the chip length.

Figure 15:
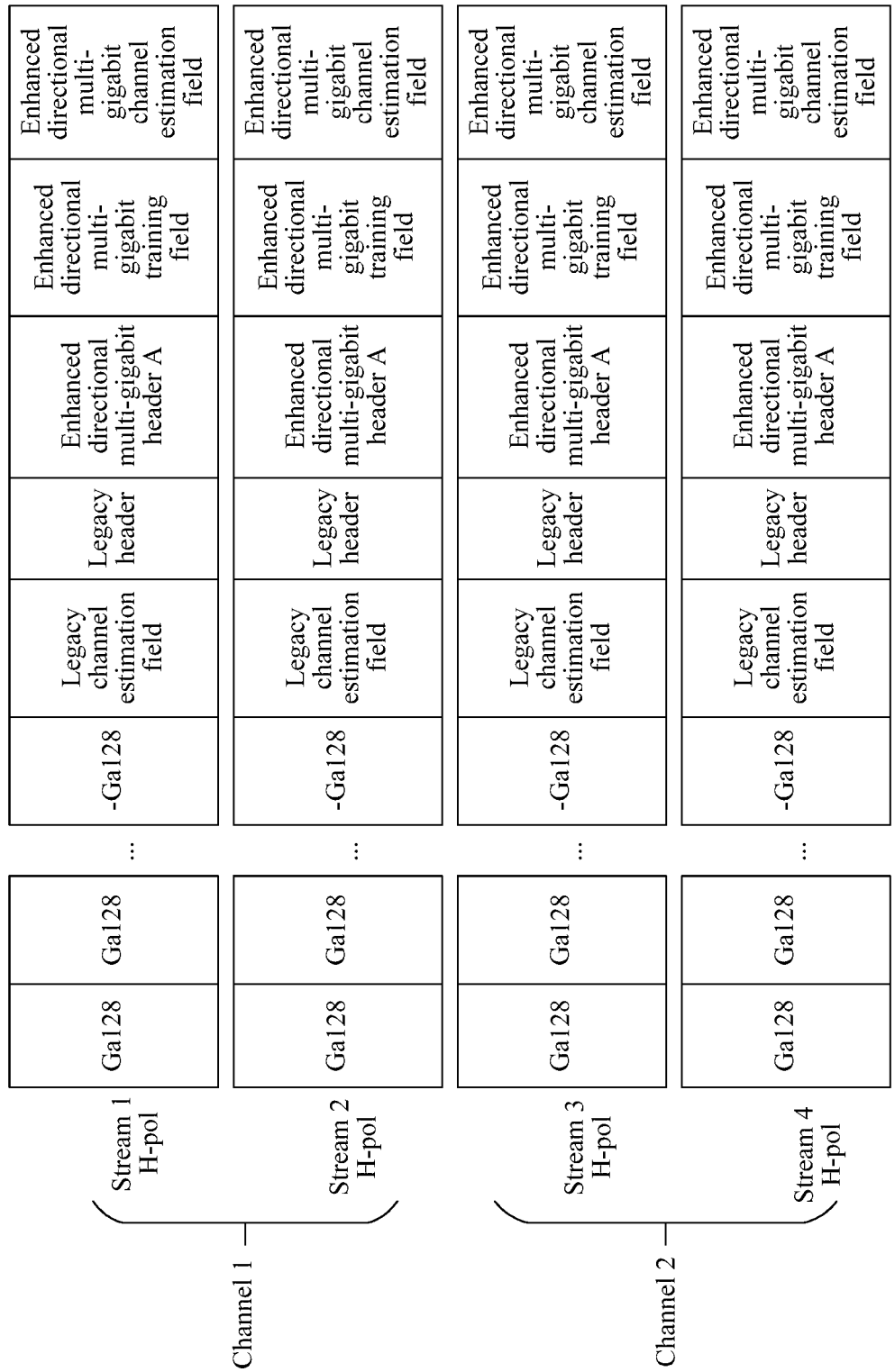
FIG. 15 is a schematic diagram of a CSD in a 4×4 MIMO mode according to another embodiment of the present invention.

It should be understood that, 4×4 MIMO using both channel aggregation and orthogonal polarization antennas is shown in FIG. 15. FIG. 15 is a schematic diagram of a CSD in a 4×4 MIMO mode according to an embodiment of the present invention. In FIG. 15, because channel aggregation is used, a stream 1 and a stream 2 are sent on a channel 1, and a stream 3 and a stream 4 are sent on a channel 2. Therefore, there is no interference between the streams (the stream 1 and the stream 2) on the channel 1 and the streams (the stream 3 and the stream 4) on the channel 2, and a CSD does not need to be used. For the stream 1 and the stream 2 on the channel 1, and the stream 3 and the stream 4 on the channel 2, because the stream 1 and the stream 2 are sent by using an orthogonal polarization antenna, and the stream 3 and the stream 4 are sent by using an orthogonal polarization antenna, when receiving and sending parties implement orthogonal polarization matching, a CSD does not need to be used either. It should be understood that, in this embodiment of the present invention, the channel 1 and the channel 2 are merely examples for description, and may be any two channels meeting a channel aggregation requirement.

Figure 16:
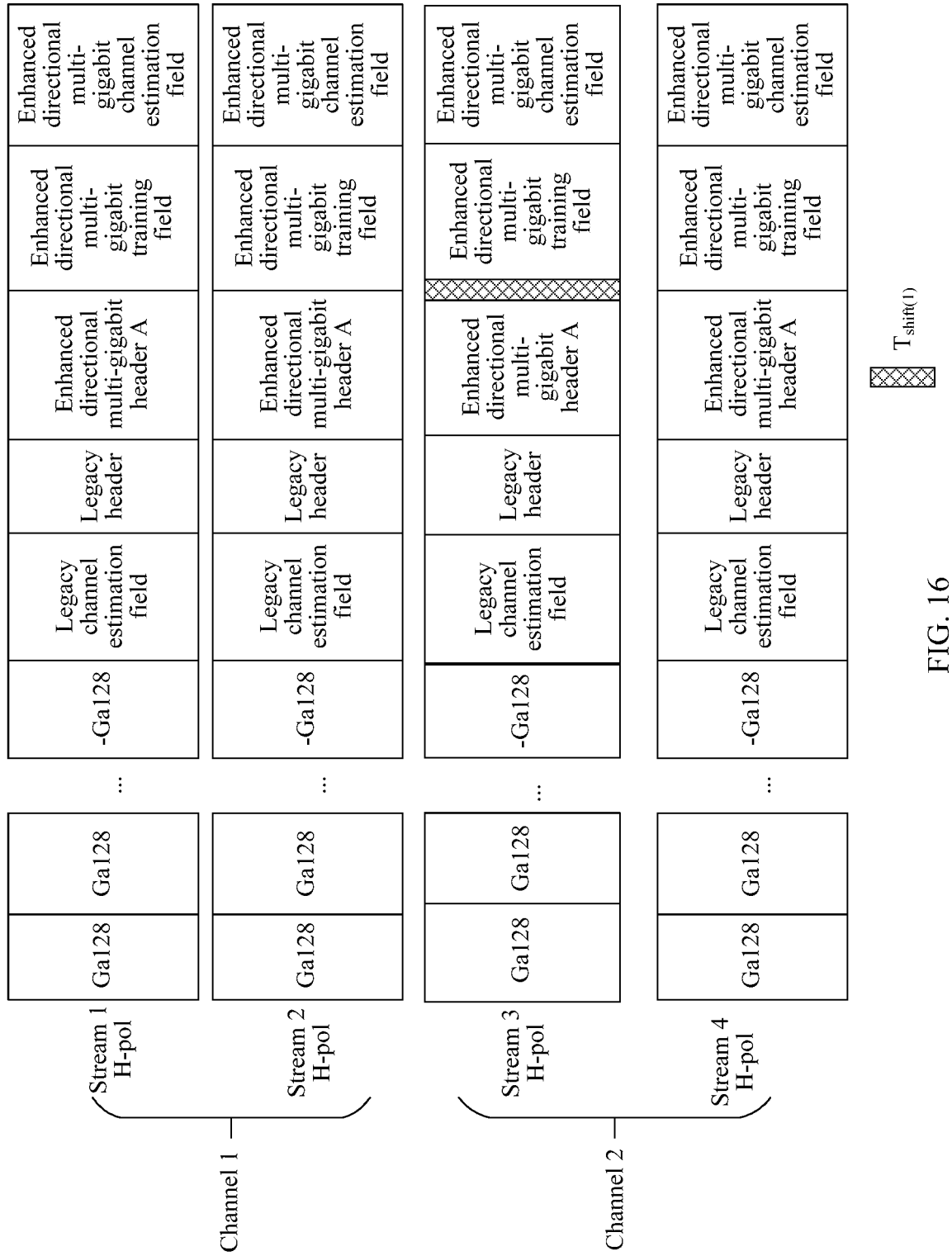
FIG. 16 is a schematic diagram of CSD coding in a 4×4 MIMO mode according to another embodiment of the present invention.

In a channel aggregation mode, there may be a relatively large channel spacing (for example, a spacing of at least one channel) between channels. In consideration of that there may be a relatively large difference between channel frequency responses of different channels, and a relatively large channel difference may cause dual-polarized beams to be no longer orthogonal, in this case, different CSD feedback indications should be respectively used for streams on different channels. For example, FIG. 16 is a schematic diagram of a CSD in a 4×4 MIMO mode according to another embodiment of the present invention. As shown in FIG. 16, assuming that devices of receiving and sending parties each use two different dual-polarized antennas, and the dual-polarized antennas work on different channels, if a result of the BF training shows that a stream 1 and a stream 2 on a channel 1 have relatively good orthogonal polarization beams, and orthogonality of dual-polarized beams between a stream 3 and a stream 4 on a channel 2 is relatively poor, it is set in such a manner that no CSD is required for the two streams on the channel 1, and a CSD needs to be used for the two streams on the channel 2. For example, on the stream 3, a partial sequence with a CSD coded value being $T_{shift(1)}$ is cyclically shifted to a rear end of an EDMG-Header-A field. Orthogonal polarization effects of orthogonal polarization links on different channels vary greatly due to different antennas, different channels, and other factors, and different degrees of leakage of dual polarization of different antennas are caused due to different antenna positions and device movement/antenna rotation. For different channels, independent CSD feedback indications are used, to flexibly indicate whether a CSD is used for communications links on different channels, thereby more flexibly supporting requirements for different communications links on different channels.

It should be understood that, during data transmission after the BF training is completed, due to a problem of an antenna polarization mismatch caused by antenna rotation, or a larger polarization leakage caused by a transmission path, orthogonality of antenna polarization deteriorates. In this case, indication information indicating whether the CSD is to be used may be carried in an acknowledge frame or a block (block) acknowledge frame, for example, carried in a control trailer (control trailer) part of the acknowledge frame or the acknowledge frame, including: a field in the control trailer is used to indicate a stream for which the CSD should be used and a channel on which the stream is located. This is not limited in this embodiment of the present invention.

It should be further understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of this application.

Based on the beamforming training method provided in this embodiment of the present invention, whether the plurality of links (namely, the plurality of streams) corresponding to the plurality of antennas are correlated is determined based on the effective channel matrix of the BF training; and if the plurality of streams are correlated, it is determined that the CSD needs to be used for the plurality of streams; or if the plurality of streams are not correlated, it is determined that the CSD does not need to be used for the plurality of streams. The first feedback information includes the indication information indicating whether the CSD coding needs to be used for each of the plurality of links. It is determined, based on the indication information, whether the CSD coding is to be used for different streams, to help increase the packet detection rate of the legacy STA and the decoding success rate of the L-Header field in the PPDU.

The beamforming training methods in the embodiments of the present invention are described in detail above with reference to FIG. 1 to FIG. 16. A receiving device and a sending device in embodiments of the present invention are described in detail below with reference to FIG. 17 to FIG. 24.

Figure 17:
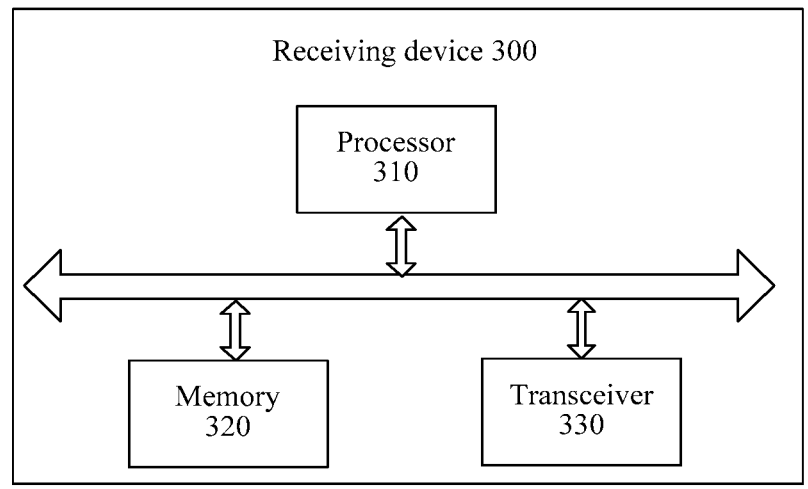
FIG. 17 is a schematic block diagram of a receiving device according to an embodiment of the present invention.

FIG. 17 is a schematic block diagram of a receiving device according to an embodiment of the present invention. It should be understood that, the embodiment of the receiving device corresponds to the method embodiment, and for similar descriptions, refer to the method embodiment. The receiving device 300 shown in FIG. 17 may be configured to perform the corresponding steps performed by the second device in FIG. 5. The receiving device 300 includes a processor 310, a memory 320, and a transceiver 330. The processor 310, the memory 320, and the transceiver 330 are connected through communication. The memory 320 stores an instruction. The processor 310 is configured to execute the instruction stored in the memory 320. The transceiver 330 is configured to perform specific signal receiving and sending when driven by the processor 310.

The processor 310 is configured to perform BF training on at least one channel with a first device based on BF training request information, where the BF training request information includes antenna configuration information of the BF training and channel configuration information of the at least one channel.

The transceiver 330 is configured to receive first feedback information sent by the first device, where the first feedback information includes a measurement result of the BF training, information about an antenna corresponding to the measurement result of the BF training, beam information of the antenna, and channel information corresponding to the antenna.

The processor 310 is further configured to determine an optimal antenna configuration and/or digital domain BF precoding information on the at least one channel based on the first feedback information.

Based on the receiving device provided in this embodiment of the present invention, in the received first feedback information of the beamforming training, when a beamforming training feedback includes an antenna configuration with highest link quality, especially in a MIMO application scenario of channel aggregation and/or orthogonal polarization, a transmit antenna and a transmit sector (a transmit beam) may be mapped to a channel that should be configured for the transmit antenna, and an SNR/an MCS/CSI, so that a sending device of a BF training sequence can obtain, from the feedback information, not only the antenna configuration corresponding to an optimal link with the highest link quality but also a channel configuration corresponding to each antenna, to be specific, learn of an antenna configuration on each channel, thereby achieving a maximum channel capacity/a maximum reachable rate.

Components in the receiving device 300 are connected through communication. To be specific, the processor 310, the memory 320, and the transceiver 330 communicate with each other and transfer a control and/or data signal to each other by using an internal connection path. The foregoing method embodiment in this application may be applied to the processor, or the processor implements the steps of the foregoing method embodiment. The processor may be an integrated circuit chip and has a signal processing capability. In an implementation process, steps in the foregoing method embodiments can be implemented by using a hardware integrated logical circuit in the processor, or by using instructions in a form of software. The processor may be a central processing unit (CPU), a network processor (NP), a combination of a CPU and an NP, a digital signal processor (DSP), an application-specific integrated circuit (ASIC), a field programmable gate array (FPGA), another programmable logic device, a discrete gate, a transistor logic device, or a discrete hardware component. It may implement or perform the methods, the steps, and logical block diagrams that are disclosed in this application. The general purpose processor may be a microprocessor, or the processor may be any conventional processor or the like. Steps of the methods disclosed in this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in an embodiment, the antenna configuration information includes a number of an antenna configured on each channel in the BF training; and the channel configuration information includes at least one of the following information: information about a channel bonding or channel aggregation manner used by a BF training sequence, indication information indicating whether the BF training is to be performed on all channels for each antenna, order information of a channel for performing the BF training for each antenna, or number information of a channel for performing the BF training for each antenna.

Optionally, in an embodiment, when the BF training is performed in a channel aggregation mode, the BF training request information further includes indication information used to indicate whether the BF training is to be performed on all channels.

Optionally, in an embodiment, when the BF training needs to be performed on a plurality of channels for each antenna, before the transceiver 330 sends the first feedback information, the transceiver is further configured to send second feedback information, where the second feedback information includes a measurement result corresponding to a channel on which the BF training has been completed.

Optionally, in an embodiment, when the BF training needs to be performed on a plurality of beams of one antenna, the measurement result of the BF training includes sequence number information of a Beam Refinement Protocol BRP packet corresponding to each beam indicated by the beam information, and length information of a training sequence in the BRP packet.

Optionally, in an embodiment, the first feedback information further includes modulation and coding scheme information of each of the at least one channel corresponding to the measurement result of the BF training.

Figure 18:
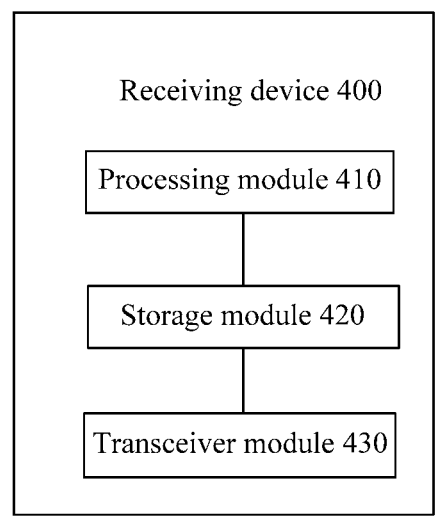
FIG. 18 is a schematic block diagram of a receiving device according to another embodiment of the present invention.

It should be noted that, in this embodiment of the present invention, the processor 310 may be implemented by a processing module, the memory 320 may be implemented by a storage module, and the transceiver 330 may be implemented by a transceiver module. As shown in FIG. 18, a receiving device 400 may include a processing module 410, a storage module 420, and a transceiver module 430.

The receiving device 300 shown in FIG. 17 or the receiving device 400 shown in FIG. 18 can implement the steps performed by the second device in FIG. 5. To avoid repetition, details are not described herein again.

Figure 19:
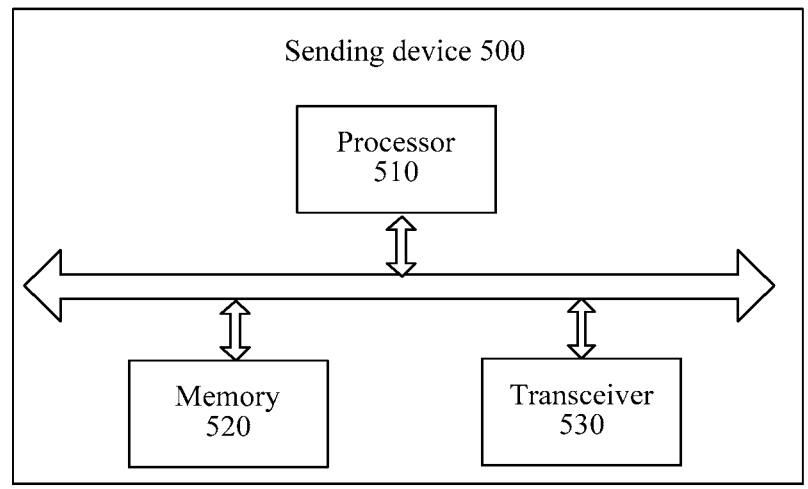
FIG. 19 is a schematic block diagram of a sending device according to an embodiment of the present invention.

FIG. 19 is a schematic block diagram of a sending device 500 according to an embodiment of the present invention. It should be understood that, the embodiment of the sending device corresponds to the method embodiment, and for similar descriptions, refer to the method embodiment. The sending device 500 shown in FIG. 19 may be configured to perform the corresponding steps performed by the first device in FIG. 5. As shown in FIG. 19, the sending device 500 includes a processor 510, a memory 520, and a transceiver 530. The processor 510, the memory 520, and the transceiver 530 are connected through communication. The memory 520 stores an instruction. The processor 510 is configured to execute the instruction stored in the memory 520. The transceiver 530 is configured to perform specific signal receiving and sending when driven by the processor 510.

The processor 510 is configured to perform BF training on at least one channel with a second device based on BF training request information, where the BF training request information includes antenna configuration information of the BF training and channel configuration information of the at least one channel.

The processor 510 is further configured to determine first feedback information, where the first feedback information includes a measurement result of the BF training, information about an antenna corresponding to the measurement result of the BF training, beam information of the antenna, and channel information corresponding to the antenna.

The transceiver 530 is configured to send the first feedback information to the second device.

Based on the sending device provided in this embodiment of the present invention, a transmit antenna, a transmit sector (a transmit beam), and a channel of the transmit antenna in the sent first feedback information (final feedback information) of the beamforming training are mapped to an SNR/an MCS/CSI measured by a receiving device, thereby learning of a maximum channel capacity from the feedback, and obtaining an optimal MIMO channel configuration.

Components in the sending device 500 are connected through communication. To be specific, the processor 510, the memory 520, and the transceiver 530 communicate with each other and transfer a control and/or data signal to each other by using an internal connection path. It should be noted that, the foregoing method embodiment in this application may be applied to the processor, or the processor implements the steps of the foregoing method embodiment. The processor may be an integrated circuit chip and has a signal processing capability. In an implementation process, steps in the foregoing method embodiments can be implemented by using a hardware integrated logical circuit in the processor, or by using instructions in a form of software. The processor may be a central processing unit CPU, an NP, a combination of a CPU and an NP, a DSP, an ASIC, an FPGA, another programmable logic device, a discrete gate, a transistor logic device, or a discrete hardware component. It may implement or perform the methods, the steps, and logical block diagrams that are disclosed in this application. The general purpose processor may be a microprocessor, or the processor may be any conventional processor or the like. Steps of the methods disclosed in this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like.

Optionally, in another embodiment of the present invention, the antenna configuration information includes a number of an antenna configured on each channel in the BF training; and the channel configuration information includes at least one of the following information: information about a channel bonding or channel aggregation manner used by a BF training sequence, indication information indicating whether the BF training is to be performed on all channels for each antenna, order information of a channel for performing the BF training for each antenna, or number information of a channel for performing the BF training for each antenna.

Optionally, in another embodiment of the present invention, when the BF training is performed in a channel aggregation mode, the BF training request information further includes indication information used to indicate whether the BF training is to be performed on all channels.

Optionally, in another embodiment of the present invention, when a plurality of rounds of BF training are performed, before the transceiver 530 receives the first feedback information, the processor 510 is further configured to determine second feedback information, where the second feedback information includes a measurement result that is obtained when the BF training needs to be performed on a plurality of channels for each antenna and that is corresponding to a channel on which the BF training has been completed; and the transceiver 530 is further configured to send the second feedback information to the second device.

Optionally, in another embodiment of the present invention, when the BF training needs to be performed on a plurality of beams of one antenna, the BF training request information further includes sequence number information of a plurality of Beam Refinement Protocol BRP packets used to perform the BF training on a plurality of beams of at least one antenna and length information of a training sequence in each BRP packet; and the measurement result of the BF training includes the sequence number information of the BRP packet corresponding to each beam indicated by the beam information and the length information of the training sequence in the BRP packet.

Optionally, in another embodiment of the present invention, the first feedback information further includes modulation and coding scheme information of each of the at least one channel corresponding to the measurement result of the BF training.

Figure 20:
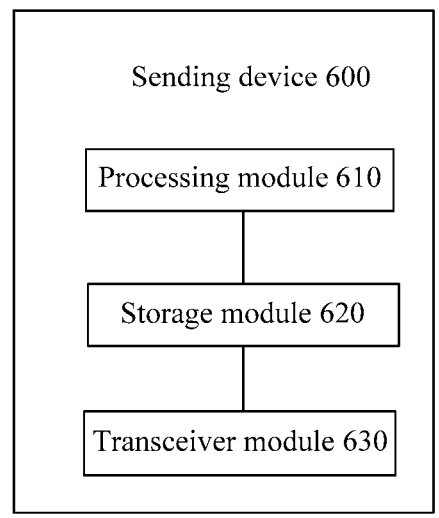
FIG. 20 is a schematic block diagram of a sending device according to another embodiment of the present invention.

It should be noted that, in this embodiment of the present invention, the processor 510 may be implemented by a processing module, the memory 520 may be implemented by a storage module, and the transceiver 530 may be implemented by a transceiver module. As shown in FIG. 20, a sending device 600 may include a processing module 610, a storage module 620, and a transceiver module 630.

The sending device 500 shown in FIG. 19 or the sending device 600 shown in FIG. 20 can implement the steps performed by the first device in FIG. 5. To avoid repetition, details are not described herein again.

Figure 21:
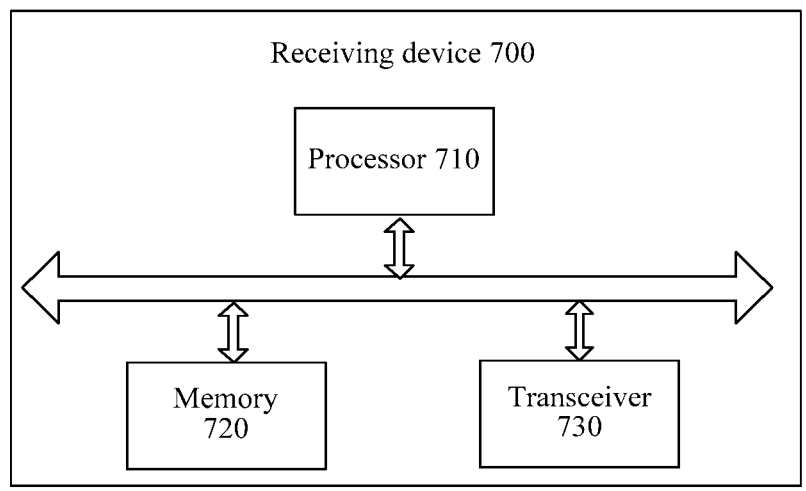
FIG. 21 is a schematic block diagram of a receiving device according to an embodiment of the present invention.

FIG. 21 is a schematic block diagram of a receiving device according to an embodiment of the present invention. It should be understood that, the embodiment of the receiving device corresponds to the method embodiment, and for similar descriptions, refer to the method embodiment. The receiving device 700 shown in FIG. 21 may be configured to perform the corresponding steps performed by the second device in FIG. 11. The receiving device 700 includes a processor 710, a memory 720, and a transceiver 730. The processor 710, the memory 720, and the transceiver 730 are connected through communication. The memory 720 stores an instruction. The processor 710 is configured to execute the instruction stored in the memory 720. The transceiver 730 is configured to perform specific signal receiving and sending when driven by the processor 710.

The processor 710 is configured to perform beamforming BF training on at least one channel with a first device based on BF training request information, where the BF training request information includes antenna configuration information and channel configuration information of the BF training The transceiver 730 is configured to receive first feedback information of the beamforming BF training sent by the first device, where the first feedback information includes indication information used to indicate whether a cyclic shift diversity CSD needs to be used for a plurality of space-time streams corresponding to a plurality of antennas.

The processor 710 is further configured to determine, based on the first feedback information, whether the CSD is to be used for each of the plurality of space-time streams.

Based on the receiving device provided in this embodiment of the present invention, whether the CSD needs to be used for the plurality of space-time streams corresponding to the plurality of antennas is determined based on an effective channel matrix of the BF training, and the first feedback information includes the indication information indicating whether the CSD coding needs to be used for each of the plurality of links. It may be determined, based on the indication information, whether the CSD coding is to be used for different streams, to help increase a packet detection rate of a legacy STA and a decoding success rate of an L-Header field in a PPDU.

Components in the receiving device 700 are connected through communication. To be specific, the processor 710, the memory 720, and the transceiver 730 communicate with each other and transfer a control and/or data signal to each other by using an internal connection path. The foregoing method embodiment in this application may be applied to the processor, or the processor implements the steps of the foregoing method embodiment. The processor may be an integrated circuit chip and has a signal processing capability. In an implementation process, steps in the foregoing method embodiments can be implemented by using a hardware integrated logical circuit in the processor, or by using instructions in a form of software. The processor may be a CPU, an NP, a combination of a CPU and an NP, a DSP, an ASIC, an FPGA, another programmable logic device, a discrete gate, a transistor logic device, or a discrete hardware component. It may implement or perform the methods, the steps, and logical block diagrams that are disclosed in this application. The general purpose processor may be a microprocessor, or the processor may be any conventional processor or the like. Steps of the methods disclosed in this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in another embodiment of the present invention, the antenna configuration information includes a number of an antenna configured on each channel in the BF training; and the channel configuration information includes at least one of the following information: information about a channel bonding or channel aggregation manner used by a BF training sequence, indication information indicating whether the BF training is to be performed on all channels for each antenna, order information of a channel for performing the BF training for each antenna, or number information of a channel for performing the BF training for each antenna.

Optionally, in another embodiment of the present invention, when the BF training needs to be performed on a plurality of beams of one antenna, the BF training request information further includes sequence number information of a plurality of Beam Refinement Protocol BRP packets used to perform the BF training on a plurality of beams of at least one antenna and length information of a training sequence in each BRP packet; and the measurement result of the BF training includes sequence number information of a BRP packet corresponding to each of the plurality of beams, and length information of a training sequence in the BRP packet.

Figure 22:
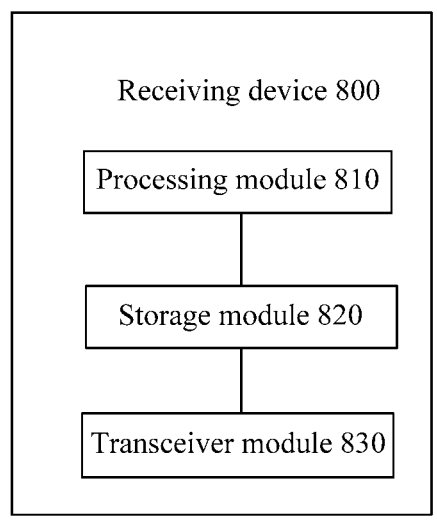
FIG. 22 is a schematic block diagram of a receiving device according to another embodiment of the present invention.

It should be noted that, in this embodiment of the present invention, the processor 710 may be implemented by a processing module, the memory 720 may be implemented by a storage module, and the transceiver 730 may be implemented by a transceiver module. As shown in FIG. 22, a receiving device 800 may include a processing module 810, a storage module 820, and a transceiver module 830.

The receiving device 700 shown in FIG. 21 or the receiving device 800 shown in FIG. 22 can implement the steps performed by the second device in FIG. 11. To avoid repetition, details are not described herein again.

Figure 23:
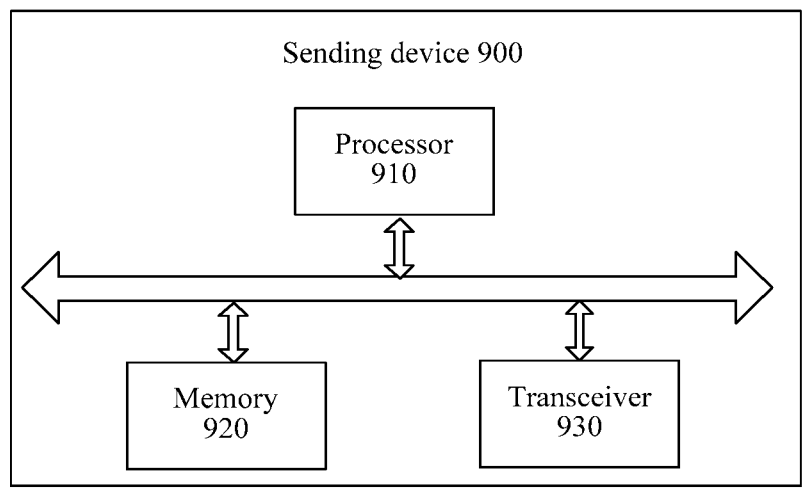
FIG. 23 is a schematic block diagram of a sending device according to an embodiment of the present invention.

FIG. 23 is a schematic block diagram of a sending device 900 according to an embodiment of the present invention. It should be understood that, the embodiment of the sending device corresponds to the method embodiment, and for similar descriptions, refer to the method embodiment. The sending device 900 shown in FIG. 23 may be configured to perform the corresponding steps performed by the first device in FIG. 11. As shown in FIG. 23, the sending device 900 includes a processor 910, a memory 920, and a transceiver 930. The processor 910, the memory 920, and the transceiver 930 are connected through communication. The memory 920 stores an instruction. The processor 910 is configured to execute the instruction stored in the memory 920. The transceiver 930 is configured to perform specific signal receiving and sending when driven by the processor 910.

The processor 910 is configured to perform BF training on at least one channel with a second device based on BF training request information, where the BF training request information includes antenna configuration information of the BF training and channel configuration information of the at least one channel.

The processor 910 is further configured to determine, based on a measurement result of the BF training, whether a cyclic shift diversity CSD needs to be used for a plurality of space-time streams corresponding to a plurality of antennas.

The transceiver 930 is configured to send first feedback information to the second device, where the first feedback information includes indication information used to indicate whether the CSD needs to be used for each of the plurality of space-time streams.

Based on the sending device provided in this embodiment of the present invention, whether the plurality of space-time streams (namely, a plurality of streams) corresponding to the plurality of antennas are correlated is determined based on an effective channel matrix of the BF training; and if the plurality of streams are correlated, it is determined that the CSD needs to be used for the plurality of streams; or if the plurality of streams are not correlated, it is determined that the CSD does not need to be used for the plurality of streams. The first feedback information includes the indication information indicating whether the CSD coding needs to be used for each of the plurality of space-time streams. It is determined, based on the indication information, that the CSD is to be used for different streams, to help increase a packet detection rate of a legacy STA and a decoding success rate of an L-Header field in a PPDU.

Components in the sending device 900 are connected through communication. To be specific, the processor 90, the memory 920, and the transceiver 930 communicate with each other and transfer a control and/or data signal to each other by using an internal connection path. The foregoing method embodiment in this application may be applied to the processor, or the processor implements the steps of the foregoing method embodiment. The processor may be an integrated circuit chip and has a signal processing capability. In an implementation process, steps in the foregoing method embodiments can be implemented by using a hardware integrated logical circuit in the processor, or by using instructions in a form of software. The processor may be a CPU, an NP, a combination of a CPU and an NP, a DSP, an ASIC, an FPGA, another programmable logic device, a discrete gate, a transistor logic device, or a discrete hardware component. It may implement or perform the methods, the steps, and logical block diagrams that are disclosed in this application. The general purpose processor may be a microprocessor, or the processor may be any conventional processor or the like. Steps of the methods disclosed in this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in another embodiment of the present invention, the processor 910 is specifically configured to: when it is determined, based on the measurement result, that the plurality of space-time streams respectively belong to different channels, determine that the CSD is not used for the plurality of space-time streams; or when it is determined, based on the measurement result, that at least two of the plurality of space-time streams belong to a same channel, determine, depending on whether the at least two space-time streams are correlated, whether the CSD needs to be used for the at least two space-time streams.

Optionally, in another embodiment of the present invention, the processor 910 is specifically configured to: when at least two of the plurality of space-time streams belong to a same channel, when the at least two space-time streams use a same polarization manner, determine that the at least two space-time streams are correlated; and determine, in the at least two space-time streams, a space-time stream for which the CSD needs to be used.

Optionally, in another embodiment of the present invention, the processor 910 is specifically configured to: when at least two of the plurality of space-time streams belong to a same channel, when the at least two space-time streams use different orthogonal polarization manners, and a value of a correlation between the at least two space-time streams is less than a preset value, determine that the at least two space-time streams are not correlated; and determine that the CSD does not need to be used for the at least two space-time streams.

Figure 24:
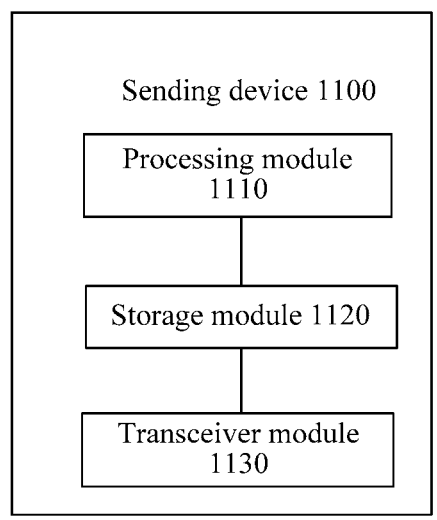
FIG. 24 is a schematic block diagram of a sending device according to another embodiment of the present invention.

It should be noted that, in this embodiment of the present invention, the processor 910 may be implemented by a processing module, the memory 920 may be implemented by a storage module, and the transceiver 930 may be implemented by a transceiver module. As shown in FIG. 24, a receiving device 1100 may include a processing module 1110, a storage module 1120, and a transceiver module 1130.

The sending device 900 shown in FIG. 23 or the sending device 1100 shown in FIG. 24 can implement the steps performed by the first device in FIG. 11. To avoid repetition, details are not described herein again.

An embodiment of the present invention further provides a computer-readable medium, configured to store computer program code. The computer program includes an instruction used to perform the beamforming training methods in the embodiments of the present invention in FIG. 5 and FIG. 11. The readable medium may be a read-only memory (ROM) or a random access memory (RAM). This is not limited in this embodiment of the present invention.

It should be understood that, the term "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A beamforming (BF) training method, comprising:
after BF training request information is generated in a BF training establishment phase, performing BF training on at least one channel with a first device based on the BF training request information, wherein the BF training request information comprises antenna configuration information of the BF training and channel configuration information of the at least one channel, wherein the channel configuration information comprises at least one of:
information about a channel bonding manner or a channel aggregation manner used by a BF training sequence; or
number information of a channel for performing the BF training for each antenna;
receiving first feedback information sent by the first device, wherein the first feedback information comprises a measurement result of the BF training, and
a channel number for performing the BF training for a transmit antenna, wherein the measurement result of the BF training comprises a number of an antenna corresponding to the measurement result of the BF training and a beam number of the transmit antenna corresponding to the measurement result of the BF training; and
determining at least one of an optimal antenna configuration or digital domain BF precoding information on the at least one channel based on the first feedback information.

2. The method according to claim 1, wherein, before the receiving first feedback information, the method further comprises:
receiving second feedback information, wherein the second feedback information comprises a measurement result obtained when the BF training needs to be performed on a plurality of channels for each antenna and corresponding to a channel on which the BF training has been completed.

3. A beamforming (BF) training method, comprising:
after BF training request information is generated in a BF training establishment phase, performing BF training on at least one channel with a second device based on the BF training request information, wherein the BF training request information comprises antenna configuration information of the BF training and channel configuration information of the at least one channel, and wherein the channel configuration information comprises at least one of:
information about a channel bonding manner or a channel aggregation manner used by a BF training sequence; or
number information of a channel for performing the BF training for each antenna;
determining first feedback information, wherein the first feedback information comprises a measurement result of the BF training,
and a channel number for performing the BF training for a transmit antenna, wherein the measurement result of the BF training comprises a number of an antenna corresponding to the measurement result of the BF training and a beam number of the transmit antenna corresponding to the measurement result of the BF training; and
sending the first feedback information to the second device.

4. The method according to claim 3, wherein, before the sending the first feedback information to the second device, the method further comprises:
determining second feedback information, wherein the second feedback information comprises a measurement result obtained when the BF training needs to be performed on a plurality of channels for each antenna and corresponding to a channel on which the BF training has been completed; and
sending the second feedback information to the second device.

5. A receiving device, comprising at least one processor, a transceiver, and a non-transitory memory, wherein the memory is configured to store an instruction, and the at least one processor is configured to execute the instruction stored in the memory to control the transceiver to receive or send a signal, wherein:
the at least one processor is configured to:
after BF training request information is generated in a BF training establishment phase, perform beamforming (BF) training on at least one channel with a first device based on the BF training request information, wherein the BF training request information comprises antenna configuration information of the BF training and channel configuration information of the at least one channel, and wherein the channel configuration information comprises at least one of:
information about a channel bonding manner or a channel aggregation manner used by a BF training sequence; or
number information of a channel for performing the BF training for each antenna;
the transceiver is configured to receive first feedback information sent by the first device, wherein the first feedback information comprises a measurement result of the BF training, and
a channel number for performing the BF training for a transmit antenna, wherein the measurement result of the BF training comprises a number of an antenna corresponding to the measurement result of the BF training and a beam number of the transmit antenna corresponding to the measurement result of the BF training; and the at least one processor is configured to determine at least one of an optimal antenna configuration or digital domain BF precoding information on the at least one channel based on the first feedback information.

6. The receiving device according to claim 5, wherein, before the transceiver receives the first feedback information, the transceiver is configured to receive second feedback information, wherein the second feedback information comprises a measurement result obtained when the BF training needs to be performed on a plurality of channels for each antenna and corresponding to a channel on which the BF training has been completed.

7. A sending device, comprising at least one processor, a transceiver, and a non-transitory memory, wherein the memory is configured to store an instruction, and the at least one processor is configured to execute the instruction stored in the memory to control the transceiver to receive or send a signal, wherein:

the at least one processor is configured to:
after BF training request information is generated in a BF training establishment phase, perform beamforming (BF) training on at least one channel with a second device based on the BF training request information, wherein the BF training request information comprises antenna configuration information of the BF training and channel configuration information of the at least one channel, and wherein the channel configuration information comprises at least one of:

information about a channel bonding manner or a channel aggregation manner used by a BF training sequence; or number information of a channel for performing the BF training for each antenna; and determine first feedback information, wherein the first feedback information comprises a measurement result of the BF training, and a channel number for performing the BF training for a transmit antenna, wherein the measurement result of the BF training comprises a number of an antenna corresponding to the measurement result of the BF training and a beam number of the transmit antenna corresponding to the measurement result of the BF training; and the transceiver is configured to send the first feedback information to the second device.

8. The sending device according to claim 7, wherein, before the transceiver sends the first feedback information to the second device, the at least one processor is configured to determine second feedback information, wherein the second feedback information comprises a measurement result obtained when the BF training needs to be performed on a plurality of channels for each antenna and corresponding to a channel on which the BF training has been completed; and the transceiver is configured to send the second feedback information to the second device.

* * * * *